United States Patent
Okuda

(10) Patent No.: US 8,553,607 B2
(45) Date of Patent: Oct. 8, 2013

(54) RADIO BASE STATION, RELAY STATION AND COMMUNICATION CONTROL METHOD

(75) Inventor: Masato Okuda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 747 days.

(21) Appl. No.: 12/417,494

(22) Filed: Apr. 2, 2009

(65) Prior Publication Data

US 2009/0219854 A1 Sep. 3, 2009

Related U.S. Application Data

(63) Continuation of application No. PCT/JP2006/320506, filed on Oct. 13, 2006.

(51) Int. Cl.
*H04B 7/14* (2006.01)

(52) U.S. Cl.
USPC .......................................... 370/315

(58) Field of Classification Search
USPC ......... 370/203, 204–215, 229–253, 310–337, 370/338–350, 395.1, 395.3, 395.4, 395.41, 370/395.42, 395.5, 395.52, 395.53, 370/412–421, 431–529
See application file for complete search history.

(56) References Cited

U.S. PATENT DOCUMENTS

| 6,473,617 | B1* | 10/2002 | Larsen et al. | 455/446 |
|---|---|---|---|---|
| 7,751,776 | B2* | 7/2010 | Fujita | 455/7 |
| 7,873,002 | B2* | 1/2011 | Cai | 370/329 |
| 7,965,985 | B2* | 6/2011 | Sheen et al. | 455/63.2 |
| 2004/0203967 | A1* | 10/2004 | Yamaguchi et al. | 455/509 |
| 2006/0046643 | A1 | 3/2006 | Izumikawa et al. | |
| 2006/0153132 | A1 | 7/2006 | Saito | |
| 2007/0072604 | A1* | 3/2007 | Wang | 455/428 |
| 2007/0201392 | A1* | 8/2007 | Ramachandran | 370/315 |
| 2008/0025280 | A1* | 1/2008 | Hsu et al. | 370/341 |
| 2008/0045144 | A1* | 2/2008 | Fujita | 455/7 |
| 2008/0070582 | A1* | 3/2008 | Cai | 455/450 |
| 2008/0085677 | A1* | 4/2008 | Sheen et al. | 455/7 |
| 2008/0144632 | A1* | 6/2008 | Rabie et al. | 370/395.5 |

FOREIGN PATENT DOCUMENTS

| JP | 8186863 | 7/1996 |
|---|---|---|
| JP | 2001513968 | 9/2001 |
| JP | 2003264867 | 9/2003 |
| JP | 2005117331 | 4/2005 |
| JP | 2005252677 | 9/2005 |
| JP | 200848286 | 2/2008 |
| WO | 2005064872 A1 | 7/2005 |
| WO | WO2006106766 | 10/2006 |

OTHER PUBLICATIONS

Chinese Office Action dated Jul. 25, 2011 for Application No. 200680056058.1.
International Search Report dated Jan. 30, 2007.

(Continued)

*Primary Examiner* — Jung-Jen Liu
(74) *Attorney, Agent, or Firm* — Smith, Gambrell & Russell, LLP

(57) ABSTRACT

A radio base station which performs data transmission with radio terminals under a plurality of relay stations via the plurality of relay stations respectively, including a control unit which transmits a first data addressed to a first radio terminal under a first relay station and a second data addressed to a second ratio terminal under a second relay station, in at least partially timing.

10 Claims, 27 Drawing Sheets

(56) References Cited

OTHER PUBLICATIONS

IEEE STD 802.16e-2005Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1 (Feb. 29, 2006).

IEEE STD 802.16-2004 for Local and metropolitan area networks Part 16: Air Interface for Fixed Broadband Wireless Access Systems (Oct. 1, 2004).

Effect of MAP Multiplexing in IEEE 802.16-based relayed system (2006).

Japanese Office Action dated Mar. 29, 2011 for application No. 2008-538553.

Notification of the Second Office Action dated Jun. 4, 2012, issued in corresponding Chinese Patent Application No. 200680056058.1.

Extended European Search Report dated Nov. 22, 2012 issued for corresponding European Patent Application No. 06811779.5-2412 / 2059059.

Haruki Izumikawa, et al. "MAP Multiplexing in IEEE 802.16 Mobile Multi-Hop Relay"; The 17th Annual IEEE International Symposium on Personal, Indoor and Mobile Radio Communications, pp. 1-5, Sep. 1, 2006.

Christian Hoymann, et al. "Multihop Communication in Relay Enhanced IEEE 802.16 Networks", The 17th Annual IEEE International Symposium on Personal, Indoor and Mobile Radio Communications, pp. 1-4, Sep. 1, 2006.

Ralf Pabst, Aghvami H, et al. "Relay-Based Development Concepts for Wireless and Mobile Broadband Radio", IEEE Communications Magazine. vol. 42, No. 9, pp. 80-89, Sep. 1, 2004.

Gang Shen, et al., "Recommendations on IEEE 802.16j; IEEE 802.16 Presentation Submission Template (Rev. 8.3); Document No. IEEE C802.16j-06/004r1", IEEE 802.16j Session #43 Tel Aviv, Israel, pp. 1-14, May 8, 2006 XP-002629650.

\* cited by examiner

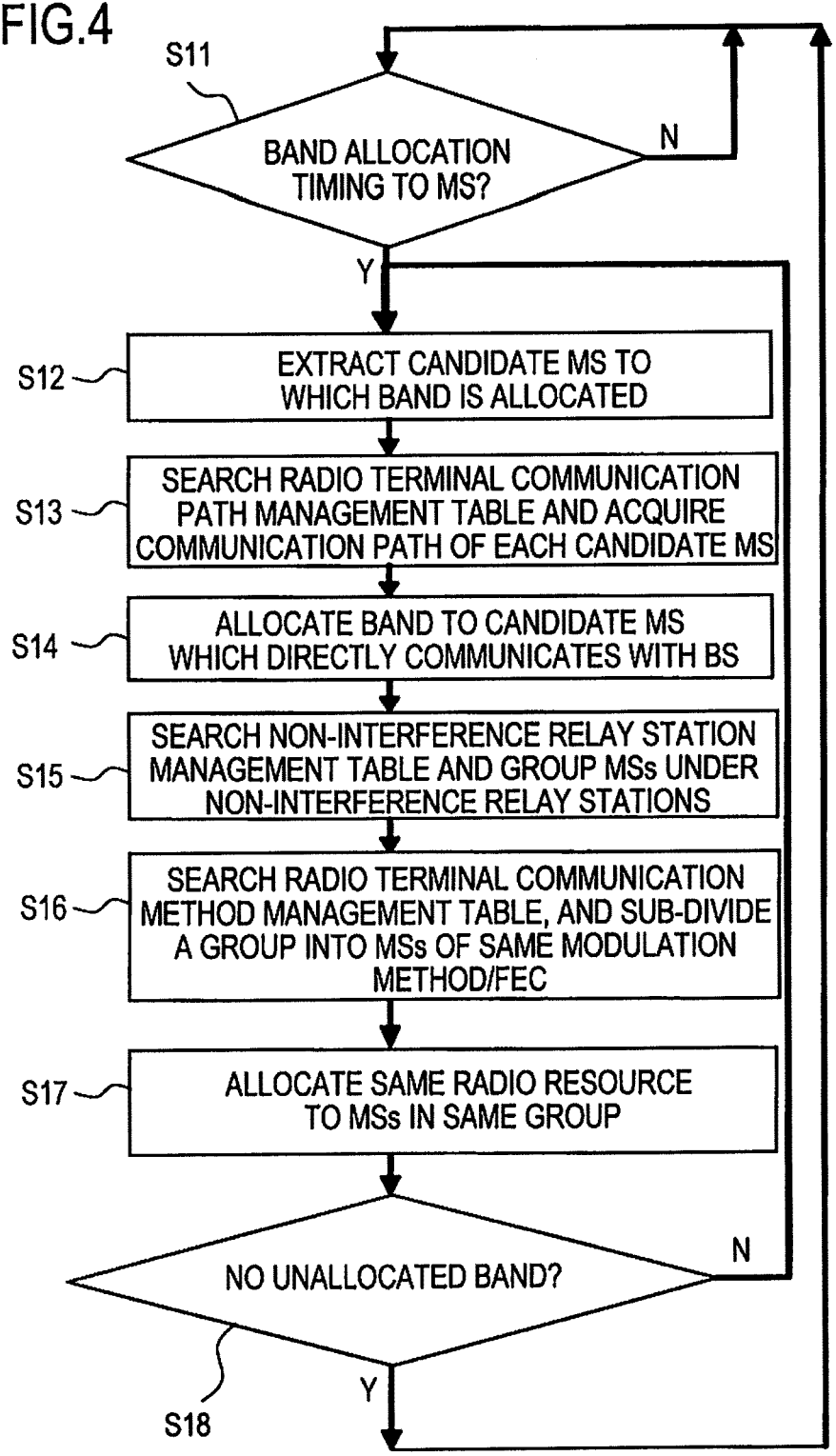

| Burst Profile DL-MAP IE | | | |
|---|---|---|---|
| Field Name | | Field Length | Value |
| DIUC | | 4b | 0-12 |
| < If INC_CID == 1 > | | | |
| | N_CID | 8 | Number of CIDs |
| | CID | 16b | CID of MS#1 |
| | CID | 16b | CID of MS#2 |
| Symbol Offset | | 8b | |
| Subchannel Offset | | 6b | |
| Boosting | | 3b | |
| Number of OFDMA Symbols | | 7b | |
| Number of Subchannels | | 6b | |
| RCI (Repetition Code Index) | | 2b | |

SPECIFY ONE BURST FOR DATA ADDRESSED TO MS UNDER DIFFERENT RS

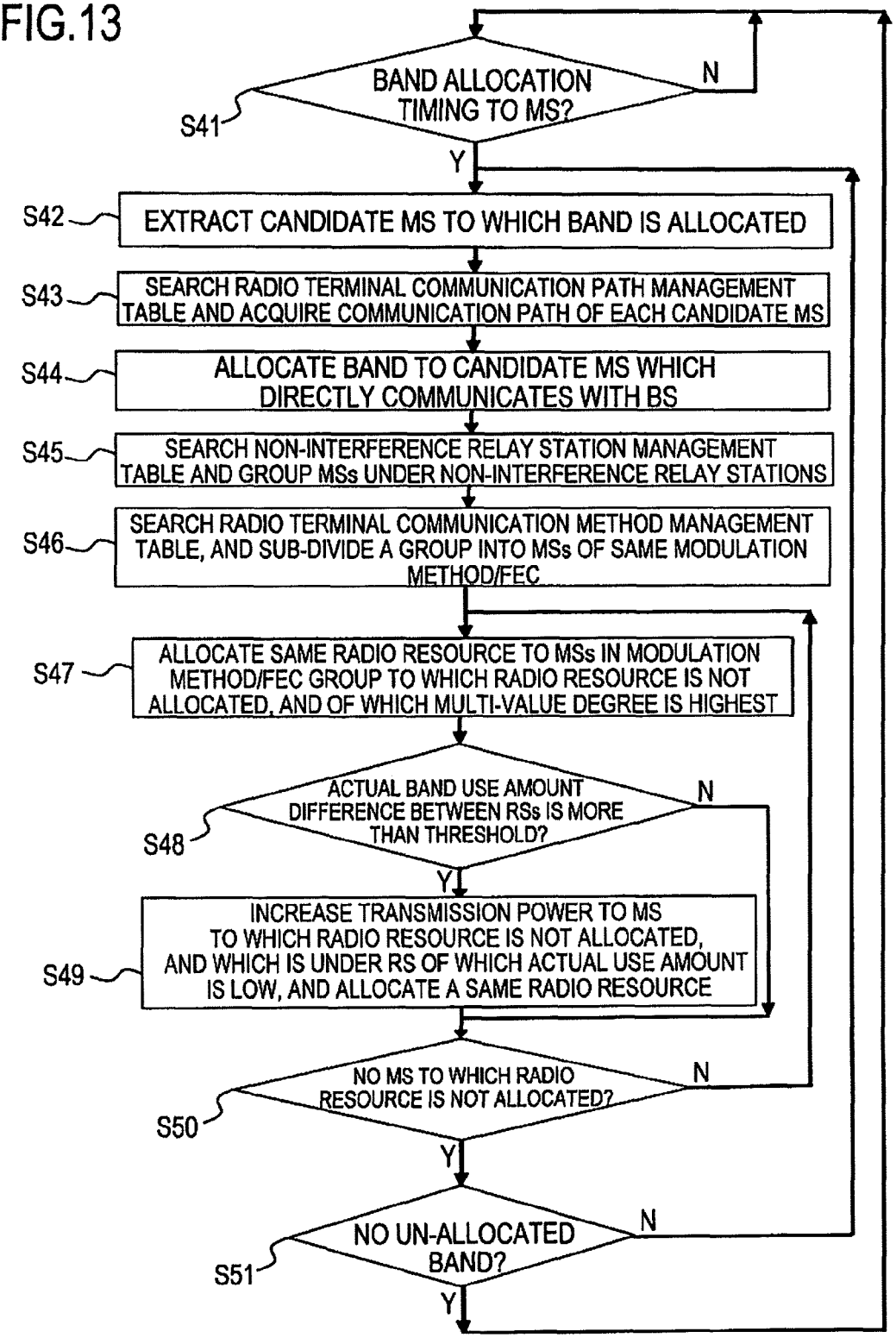

FIG.16A

| RS-MAP message | | |
|---|---|---|
| Field Name | Field Length | Value |
| Management Message Type | 8b | TBD |
| < n x RS-MAP_IE for OFDMA PHY> | | |

FIG.16B

| Burst Profile RS-MAP IE | | |
|---|---|---|
| Field Name | Field Length | Value |
| DIUC | 4b | 0-12 |
| CID | 16b | CID of RS |
| Symbol Offset | 8b | |
| Subchannel Offset | 6b | |
| Boosting | 3b | 000: normal    100: +3dB<br>001: +6dB    101: -3dB<br>010: -6dB    110: -9dB<br>011: +9dB    111: -12dB |
| Number of OFDMA Symbols | 7b | |
| Number of Subchannels | 6b | |
| RCI (Repetition Code Index) | 2b | 00: No repetition coding<br>01: Repetition coding of 2<br>10: Repetition coding of 4<br>11: Repetition coding of 6<br>#only for QPSK |

FIG.24

| DL-MAP message | | | |
|---|---|---|---|
| | Field Name | Field Length | Value |
| | Management Message Type | 8b | 2 |
| | < PHY Synchronization Field : OFDMA-PHY> | | |
| | Field Name | Field Length | Value |
| | Frame Duration Code | 8b | |
| | Frame Number | 24b | |
| | DCD count | 8b | |
| | Base Station ID | 48b | Base Station Address |
| | < n x DL-MAP_IE for OFDMA PHY> | | |

FIG.25

| Burst Profile DL-MAP IE | | |
|---|---|---|
| Field Name | Field Length | Value |
| DIUC | 4b | 0-12 |
| < If INC_CID == 1 > | | |
| N_CID | 8 | Number of CIDs |
| CIDs | nx16b | |
| Symbol Offset | 8b | |
| Subchannel Offset | 6b | |
| Boosting | 3b | 000: normal  100: +3dB<br>001: +6dB   101: -3dB<br>010: -6dB   110: -9dB<br>011: .+9dB  111: -12dB |
| Number of OFDMA Symbols | 7b | |
| Number of Subchannels | 6b | |
| RCI (Repetition Code Index) | 2b | 00: No repetition coding<br>01: Repetition coding of 2<br>10: Repetition coding of 4<br>11: Repetition coding of 6<br>#only for QPSK |

FIG.27A

| UL-MAP message | | |
|---|---|---|
| Field Name | Field Length | Value |
| Management Message Type | 8b | 3 |
| Uplink Channel IE | 8b | |
| UCD Count | 8b | |
| Allocation Start Time | 32b | |
| No. OFDMA Symbols | 8b | Number of Symbols for UL subframe |
| < n x UL-MAP_IE for OFDMA PHY> | | |

FIG.27B

| Uplink Burst Profile UL-MAP IE | | |
|---|---|---|
| Field Name | Field Length | Value |
| CID | 16b | |
| UIUC | 4b | 1-10 |
| Duration | 10b | No of Slots |
| Repetition Code Indication | 2b | Indicates the repetition code used inside the allocated burst.<br>00: No repetition coding<br>01: Repetition coding of 2<br>10: Repetition coding of 4<br>11: Repetition coding of 6 |

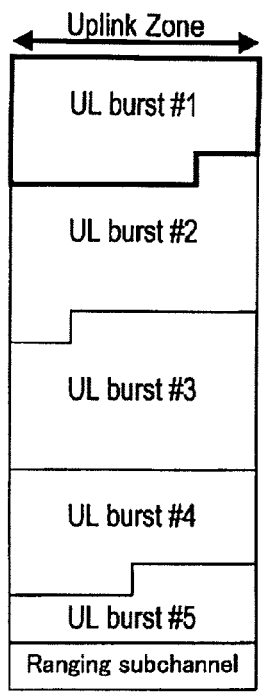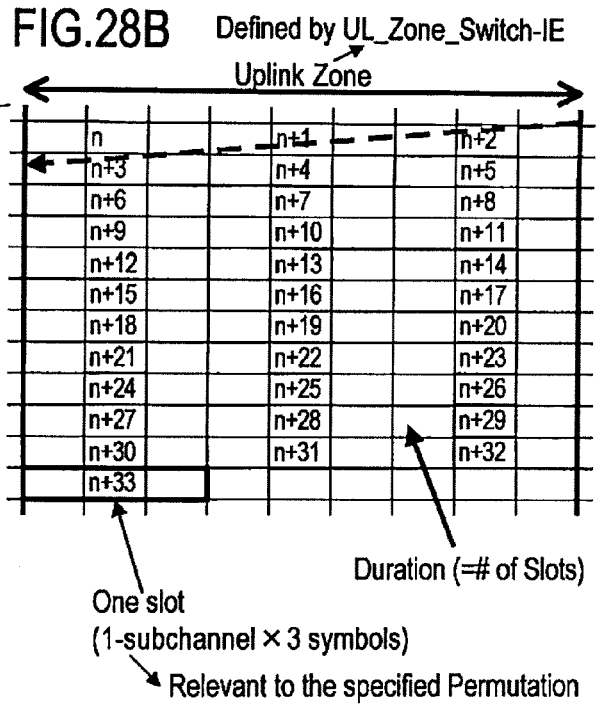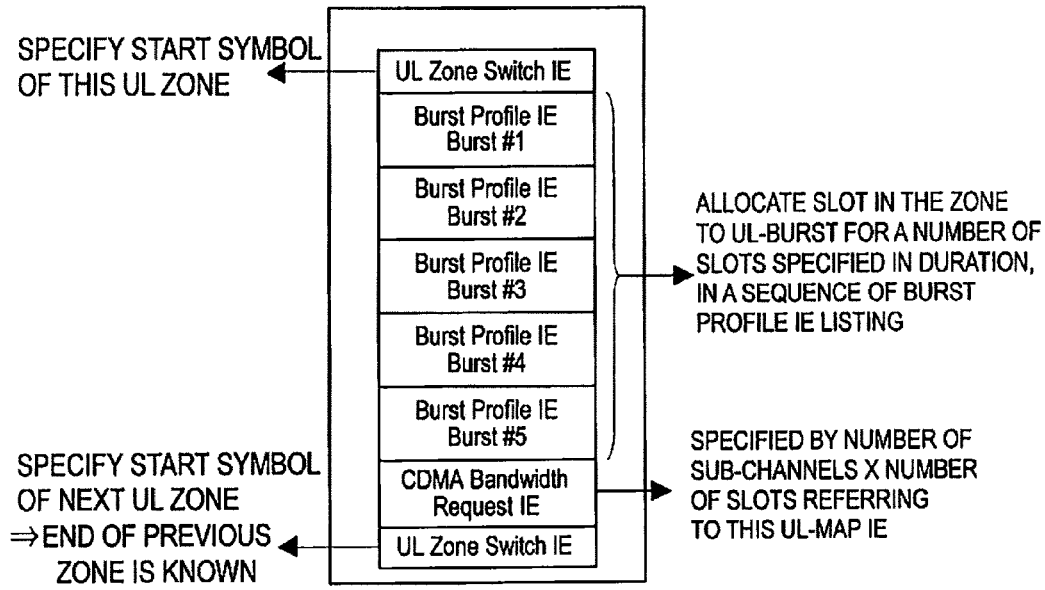

US 8,553,607 B2

RADIO BASE STATION, RELAY STATION AND COMMUNICATION CONTROL METHOD

CROSS-REFERENCE TO RELATED APPLICATION

This application is a continuation of International Application No. PCT/JP2006/320506, filed on Oct. 13, 2006, now pending, herein incorporated by reference.

FIELD

The present invention relates to a radio base station, relay station, and communication control method using radio communication, and more particularly to a radio base station, relay station, and communication control method in which utilization efficiency of frequencies to be used is improved.

BACKGROUND

In IEEE 802.16WG, which is known as an example of a radio communication system standard, two types are specified: IEEE 802.16d concerns fixed communication (e.g. see the following Non-patent Document 1) and IEEE 802.16e concerns mobile communication (e.g. see the following Non-patent Document 2).

FIG. 22 depicts an image of the services provided by IEEE 802.16d and IEEE 802.16e. These services are based on a P-MP (Point-to-Multipoint) connection, where a plurality of terminals 101 to 103 are connected to one radio base station 100.

In this way, IEEE 802.16d or the like is based on the P-MP connection, so the service area is limited to a cover area (cell) covered by the radio base station 100, and the communication rate drops at the cell edge.

To solve this problem, in IEEE 802.16WG, a relay station to relay communication between the radio base station and radio terminals is under consideration (IEEE 802.16j).

FIG. 23 is a diagram depicting an example of a network configuration of IEEE 802.16j. In FIG. 23, the relay stations RS are disposed in order to improve the communication rates of two radio terminals MS#1 and MS#2, which are located near a cell edge of the radio base station BS.

On the other hand, in IEEE 802.16d and IEEE 802.16e, the radio terminal MS communicates with the radio base station BS according to MAP information which is sent from the radio base station BS.

For the MAP information, a radio resource which the radio terminal MS uses for communication (frequency channel and time (transmission timing): hereafter called "burst"), modulation method and encoding method of the burst, and communication target radio terminal MS, are specified. The MAP information has a DL-MAP message of a downlink direction and a UL-MAP massage of a uplink direction.

FIG. 24 depicts an example of the DL-MAP message, and FIG. 25 depicts an example of a Burst Profile DL-MAP IE (hereafter called "DL-MAP IE") included in the DL-MAP message. One or a plurality of (n in the example of FIG. 24) DL-MAP IE(s) is or are inserted in the "DL-MAP_IE for OFDMA PHY" field of the DL-MAP message.

As FIG. 25 depicts, DL-MAP IE has a "DIUC" field and "CID" field. In the "DIUC" field, a code to indicate the modulation method and encoding method (including an encoding rate) of the burst is inserted. In the "CID" field, an identifier of a connection of a packet included in the burst is inserted, and the radio terminal MS can select the burst to be decoded by recognizing the CID.

FIG. 26 depicts an allocation example of a downlink burst by DL-MAP IE. Each burst is specified by a "Symbol Offset" or the like of the DL-MAP IE, and the radio terminal MS communicates to the radio base station BS using the allocated transmission area (frequency (ordinate) and time (abscissa)).

FIG. 27A depicts an example of the UL-MAP message, and FIG. 27B depicts an example of a Burst Profile UL-MAP IE (hereafter called "UL-MAP IE") included in this message.

As FIG. 27B depicts, the UL-MAP IE includes "CID", "UIUC" and "Duration" fields.

In the "CID" field, an ID to identify the radio terminal MS, which allocated the burst, is inserted, in the "UIUC" field, a code to indicate the modulation method and encoding method (including the encoding rate) of the burst is inserted, and in the "Duration" field, a band amount (number of slots) to be allocated is inserted.

FIG. 28A and FIG. 28B depict an allocation example of the uplink burst by the UL-MAP IE. As these figures depict, allocation of the uplink burst is basically defined by a number of slots. In other words, each slot is sequentially allocated in the time axis (symbol direction: abscissa) direction, shifting to the next sub-channel (ordinate) at the break point of the Uplink Zone, and the number of slots specified in the "Duration" field are allocated. Then the first slot of the next burst is allocated, continuing from the last slot of the previous burst.

As FIG. 28A and FIG. 28B depict, unlike the case of allocation of the downlink burst which is indicated by a square formed by the number of sub-channels and the number of symbols, allocation of the uplink burst is not very complete.

As FIG. 28C depicts, each burst is sequentially allocated to the uplink burst in the sequence of UL-MAP IE ("Burst Profile IE Burst #1 . . . " in FIG. 28C).

Non-patent Document 1: IEEE Std 802.16-2004
Non-patent Document 2: IEEE Std 802.16e-2005

DISCLOSURE OF THE INVENTION

However the above mentioned allocation of the radio resource based on the DL-MAP message and UL-MAP message are examples performed between the radio base station BS and radio terminal MS. Therefore appropriately allocating the radio resource in the case when the relay station RS exists between the radio base station BS and radio terminal MS has been demanded.

It is also preferable to increase utilization efficiency of the frequency as much as possible when the radio resource is allocated. This is because throughput can be increased.

Accordingly, it is an object in one aspect of the present invention to provide a radio base station, relay station and communication control method which can appropriately allocate a radio resource when a radio communication is performed between a radio terminal and radio base station via a relay station.

It is an object in another object of the present invention to provide a radio base station, relay station, and communication control method in which utilization efficiency of frequency is improved.

According to an aspect of the present invention, a radio base station which performs data transmission with radio terminals under a plurality of relay stations via the plurality of relay stations respectively, including a map information generation unit which generates map information indicating a radio frame, so that a first transmission area from a first relay station to a first radio terminal under the first relay station, and a second transmission area from a second relay station to a second radio terminal under the second relay station, partially or completely overlap; and a transmission unit which transmits the map information.

According to another aspect of the present invention, a relay station which relays data between a subordinate radio terminal and a radio base station, including a control unit which sends first data in a transmission area where the first data addressed to the subordinate radio terminal partially or completely overlaps with second data addressed to a second radio terminal under another relay station which is different from the relay station.

According to another aspect of the present invention, a communication control method in a radio communication system which performs data transmission between each radio terminal under each of a plurality of subordinate relay stations and a radio base station via the relay stations, the method including transmitting a first data addressed to a first radio terminal under a first relay station, and a second data addressed to a second radio terminal under a second relay station, to the first and second relay station, respectively; and transmitting the first and second data from the first and second relay station respectively, so that transmission area thereof partially or completely overlap.

According to the present invention, a radio base station, relay station, and communication control method which can appropriately allocate a radio resource when radio communication is performed between a radio terminal and the radio base station via the relay station can be provided. Also a radio base station, relay station, and communication control method in which utilization efficiency of frequency has been improved can be provided.

BRIEF DESCRIPTION OF THE DRAWINGS

FIG. 4 is a flow chart depicting an example of band allocation processing;

FIG. 13 is a flow chart depicting an example of band allocation processing;

FIG. 16A is an example of an RS-MAP message, and FIG. 16B is an example of RS-MAP IE;

FIG. 24 is an example of a DL-MAP message;

FIG. 25 is an example of DL-MAP IE;

FIG. 27A is an example of a UL-MAP message, and FIG. 27B is an example of UL-MAP IE; and FIG. 28A and FIG. 28B are an example of an uplink burst allocation, and FIG. 28C is an example of a UL-MAP message.

BEST MODE FOR CARRYING OUT THE INVENTION

Preferred embodiments of the present invention will now be described.

First Embodiment

A first embodiment will be described first.

The first embodiment is an example for appropriately allocating a radio resource when radio communication is performed between a radio base station BS and a radio terminal MS via a relay station RS.

Figure 1A:
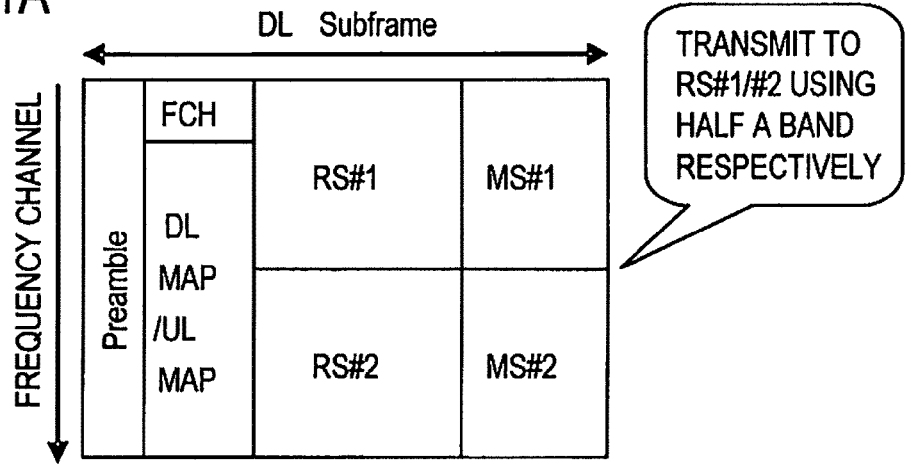
FIG. 1A is an example of a sub-frame.

FIG. 1A depicts an example of a sub-frame in the downlink direction (abscissa is time (transmission timing), ordinate is frequency channel).

As FIG. 1A depicts, the radio resource is allocated to the relay stations RS#1 and RS#2 to be transmitted simultaneously using half of the frequency band respectively. And the radio resource is allocated to the radio terminals MS#1 and MS#2 to be transmitted simultaneously using half of the frequency band respectively, too. For the allocation, a DL-MAP message is set so that the transmission areas (frequency channel and time) do not overlap between each burst.

Figure 1B:
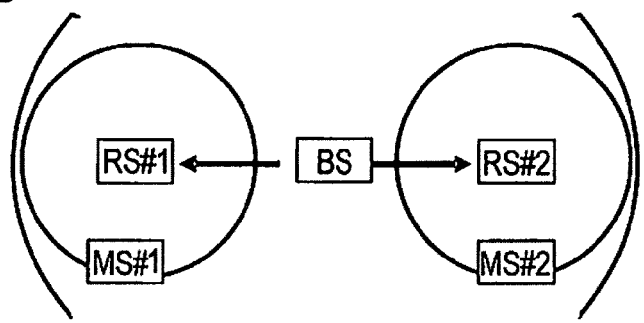
FIG. 1B and FIG. 1C are transmission examples.
Figure 1C:
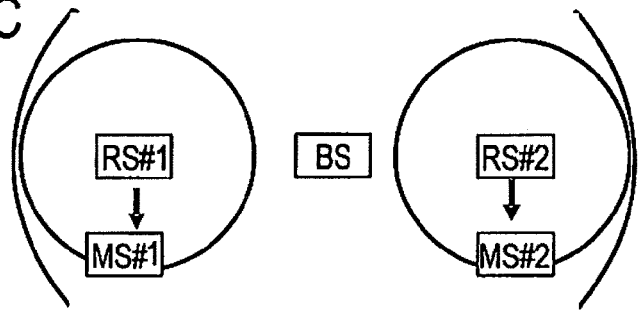

By allocating the radio resource like this, data is simultaneously sent from the radio base station BS to each relay station RS#1 and RS#2 using different frequency bands (see FIG. 1B). Then data is simultaneously sent from each relay station RS#1 and RS#2 to the subordinate radio terminals MS#1 and MS#2 respectively (see FIG. 1C).

As described above, in the communication between the radio terminal MS and radio base station BS via the relay station RS, the independent radio resource is allocated to the radio terminals MS#1 and MS#2 under the relay stations RS#1 and RS#2 respectively, so the radio resource can be appropriately allocated.

Second Embodiment

A second embodiment will now be described.

In the first embodiment, the radio resource is allocated to the relay stations RS and the subordinate radio terminals MS such that the respective transmission areas (frequency channel, transmission timing) do not overlap. However even if a plurality of relay stations RS exist under the radio base station BS, and each relay station RS is disposed at a location where mutual interference does not occur (e.g. positions with which cover area of each relay station (area where the radio communication service is provided to the radio terminal) does not overlap), the different radio resource is allocated respectively.

Therefore according to the second embodiment, the radio base station BS manages relay stations RS which do not interfere with each other, and concerning the allocation of a downlink burst (allocation of a radio resource in the downlink direction) to the radio terminals MS which communicate with a same burst profile (combination of a modulation method and encoding method) out of the radio terminals MS under such relay stations RS, the radio base station BS generates and sends DL-MAP where the downlink burst is allocated to same burst area (transmission area) in a downlink sub-frame (symbol time and frequency channel (sub-channel)). Since a same transmission area (frequency channel) can be used simultaneously for a plurality of radio terminals MS, utilization efficiency of the frequency can be improved. The allocation of the radio resource in the uplink direction will be described in detail in the fifth embodiment.

It is the same as the first embodiment, where the radio communication system has the radio terminal MS, plurality of relay stations RS, and radio base stations BS under the relay stations RS. The second embodiment will now be described in concrete terms with reference to FIG. 2 to FIG. 7.

Figure 2:
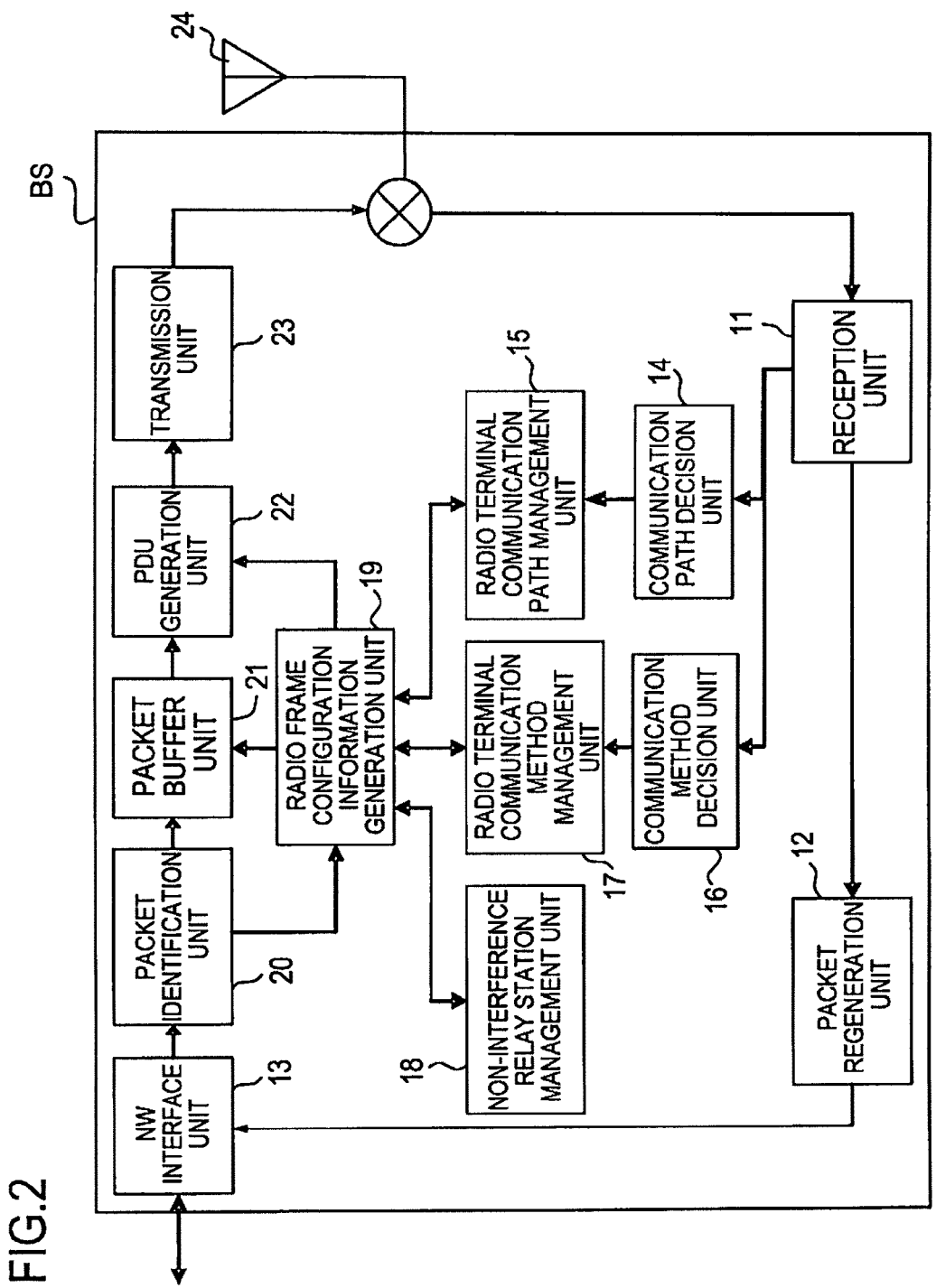
FIG. 2 is a block diagram depicting a configuration example of a radio base station.

FIG. 2 is a block diagram depicting a configuration example of the radio base station BS according to the second embodiment. The radio base station BS has a reception unit 11, packet regeneration unit 12, NW interface unit 13, communication path decision unit 14, radio terminal communication path management unit 15, communication method decision unit 16, radio terminal communication method management unit 17, non-interference relay station management unit 18, radio frame configuration information generation unit 19, packet identification unit 20, packet buffer unit 21, PDU generation unit 22 and transmission unit 23.

The reception unit 11 outputs it to the packet regeneration unit 12, when a PDU (Protocol Data Unit), including user data is received via an antenna 24. In the packet regeneration unit 12, the PDU is reconstructed into an IP (Internet Protocol) packet or the like, and is transferred to the host network via the NW interface unit 13.

The reception unit 11 also outputs to the communication method decision unit 16 radio channel performance information (e.g. CINR: Carrier to Interface and Noise Ratio) of the downlink, which the radio terminal MS measured and fed back, radio channel information of the uplink measured by the reception unit 11, or radio channel performance information of the uplink which the relay station RS measured and transferred.

The communication method decision unit 16 decides a communication method (modulation method, error correction encoding method, encoding rate) for each radio terminal MS based on the radio channel performance information, and outputs this information to the radio terminal communication method management unit 17.

Figure 3A:
FIG. 3A is an example of a radio communication method management table.

The radio terminal communication method management unit 17 holds a radio terminal communication method management table T1 and stores this information. FIG. 3A is an example of the radio terminal communication method management table T1. As FIG. 3A depicts, the modulation method "Modulation" to be used (e.g. QPSK, 16QAM), error correction code encoding method "FEC": Forward Error Correction (e.g. convolutional code, turbo code), and encoding rate (e.g. ½, ¾) are indicated for each radio terminal MS.

For the communication methods, a combination of communication methods with which fast communication is possible is selected if the radio channel performance is good, and a combination of communication methods with which slower communication is possible is selected if the radio channel performance is not good. In other words, AMC (Adaptive Modulation Control) is performed.

The communication path decision unit 14 decides an optimum communication path in terms of effective use of the radio resource, based on the respective radio channel performance information between the radio terminal MS, radio base station BS and relay station RS, transferred from the reception unit 11, and outputs this information to the radio terminal communication path management unit 15.

For example, if the CINR of a receive signal from relay station RS1 is better than the CINR of a receive signal from the radio base station BS in the radio terminal MS, then a path that passes through the relay station RS1 is selected.

Figure 3B:
FIG. 3B is an example of a radio terminal communication path management table.

The radio terminal communication path management unit 15 holds a radio terminal communication path management table T2, and stores this information. FIG. 3B is an example of the radio terminal communication path management table T2. In the example depicted in FIG. 3B, the optimum communication path of the radio terminal MS#1 is communication via the relay station RS#1, and the optimum communication path of the radio terminal MS#3 is direct communication with the radio base station BS.

Figure 3C:
FIG. 3C is an example of a non-interference relay station management table.

The non-interference relay station management unit 18 recognizes the presence of interference among each relay station RS when the relay stations RS are positioned, and stores this information in a non-interference relay station management table T3. FIG. 3C depicts an example of the non-interference relay station management table T3. This example depicts that the relay station RS#1 and the relay station RS#2 do not interfere with each other. For this information, the presence of interference may be judged based on the carrier sense by the relay station RS on a radio signal from a neighborhood relay station RS, or on a report on CINR of a receive signal from the neighborhood relay station RS of a subordinate radio terminal MS, and stored in table T3. In other words, if a receive signal from the neighborhood relay station RS has a predetermined level or more, it is regarded as the presence of interference, or if the CINR report from the radio terminal MS indicates that a signal having CINR exceeding a reference value is received from a neighborhood station, it is regarded as the presence of interference.

Needless to say, it may be judged whether mutual interference occurs based on the calculation of the location and transmission output of a plurality of relay stations, and this table is created and information is stored.

The NW interface unit 13 receives an IP packet or the like from the host network, and outputs it to the packet identification unit 20. The packet identification unit 20 identifies a destination radio terminal MS and QoS (Quality of Service) class based on such information of the IP header, and requests band allocation to the radio frame configuration information generation unit 19, and outputs the IP packet or the like to the packet buffer unit 21. The CID is specified by identifying the destination radio terminal MS.

The radio frame configuration information generation unit 19 acquires the communication method (modulation method, error correction code) of the radio terminal MS corresponding to each CID for which a band allocation is requested, from the radio terminal communication method management table T1 of the radio terminal communication method management unit 17. The radio frame configuration information generation unit 19 acquires the information whether direct communication with the radio base station BS or communication via the relay station RS is performed, and the information on the relay station RS to be the target if communication via the relay station RS is used, based on the radio terminal communication path management table T2 of the radio terminal communication path management unit 15. The radio frame configuration information generation unit 19 also acquires information on the presence of mutual interference between the target relay station RS based on the non-interference relay station management table T3 in the non-interference relay station management unit 18.

Based on this information, the radio frame configuration information generation unit 19 generates the DL-MAP message which defines a band allocation of the radio frame, and sends it via the PDU generation unit 22 and transmission unit 23, and reads the required data packet addressed to the relay station RS and radio terminal MS from the packet buffer unit 21, and sends it via the PDU generation unit 22 and transmission unit 23.

FIG. 4 is a flow chart depicting the band allocation processing to the radio terminal MS, which is performed in the radio base station BS. This processing is executed by the radio frame configuration information generation unit 19.

Firstly, the radio base station BS judges whether it is a band allocation timing for the radio terminal MS (S11). Whether it is the allocation timing or not is judged depending on whether a time to create map information for each frame (e.g. time to create map information for one frame) has come or not.

If it is not the allocation timing (N in S11), the radio base station BS waits until this timing comes. When the timing comes (Y), the radio base station BS extracts candidate radio terminals MS to which the band is allocated (S12). The candidates are extracted from destination radio terminals MS from the packet identification unit 20.

Communication paths of the candidate radio terminals MS are acquired (S13) by searching the radio terminal communication path management table T2.

The band is allocated to the radio terminal MS which directly communicates with the radio base station BS, selected out of the candidate radio terminals MS (S14). In other words, in the DL-MAP message, the transmission area in the downlink direction, which is allocated to this radio terminal MS, is defined.

Radio terminals MS, under a non-interference relay station, are grouped (S15) by searching the non-interference relay station management table T3.

Searching the radio terminal communication method management table T1, the radio terminal MS group is sub-divided into groups of radio terminals MS that use the same communication method (modulation method and error code encoding method) (S16).

After sub-division, the same radio resource is allocated to the radio terminals MS in a same group (S17). In other words, in the DL-MAP message, a same transmission area in the downlink direction is defined to the radio terminals MS belonging to the same group.

If an un-allocated band does not exist (Y in S18), DL-MAP data is generated and sent. Then processing moves to S11 again and the above mentioned processing is repeated. If an un-allocated band exists (N in S18), the processing moves to S12, and the above mentioned processing is repeated.

In the transmission area defined by the DL-MAP data, data is directly transmitted from the radio base station BS to the radio terminal MS, or data having different content is sent from a plurality of relay stations RS to each subordinate radio terminal MS.

In concrete terms, it is assumed that relay stations RS1, RS2 and RS3, which do not interfere with each other, exist, and radio terminals MS11 and MS12 exist under the relay station RS1, radio terminals MS21 and MS22 exist under the relay station RS2, and radio terminal MS31 exists under the relay station RS3.

And it is assumed that the radio terminals MS11, MS21, and MS31 correspond to the same communication method, and the radio terminals MS22 and MS32 correspond to the same communication method.

In this case, when transmission area in the downlink direction is defined in DL-MAP, the transmission area (transmission timing, transmission sub-channel) in the downlink direction of MS11, MS21 and MS31 at least partially overlaps. It is preferable that the transmission area is the same. Also the transmission band (transmission timing, transmission sub-channel) in the downlink direction of MS12 and MS22 at least partially overlaps (including the case of one transmission area being included in the other transmission area). It is preferable that the transmission area is the same.

Then in order to transmit data from the relay station RS to each radio terminal MS using the defined band, data addressed to MS11 and MS12 are sent to RS1, data addressed to MS21 and MS22 are sent to RS2, and data addressed to MS31 is sent to RS3 via the respective MMR link (communication link between the radio base station BS and relay station RS).

By this processing, the same radio resource can be allocated to the radio terminals MS which use the same communication method when the radio terminals MS are under relay stations RS which do not interfere with each other, out of a plurality of relay stations RS.

Figures 5A, 5B:
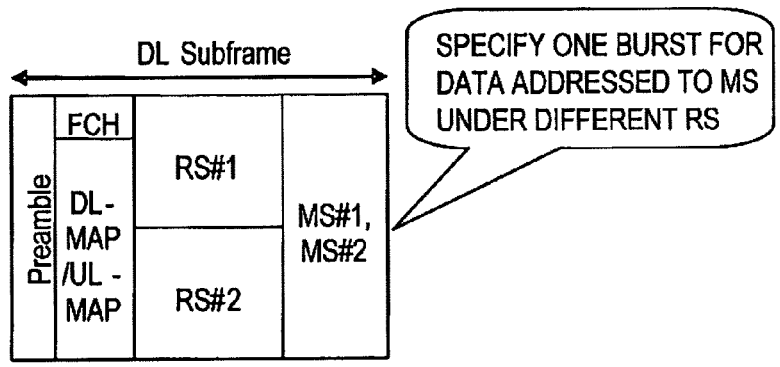
FIG. 5A is an example of DL-MAP IE.
FIG. 5B is an example of a sub-frame.

FIG. 5A depicts an example of DL-MAP IE generated by the band allocation processing, and FIG. 5B depicts an example of the downlink sub-frame.

In DL-MAP IE depicted in FIG. 5A, two CIDs (the CID of radio terminal MS#1 and the CID of radio terminal MS#2) are defined in one DL-MAP IE which defines one transmission area, and as FIG. 5B depicts, two radio terminals, MS#1 and MS#2, are placed in one burst by "Symbol Offset" or the like. In one burst, it is allowable to send data from different relay stations RS (RS#1 and RS#2 in this case) to a plurality of subordinate radio terminals MS (radio terminals MS#1 and MS#2 in this case) respectively.

Since a code value to indicate a combination of the modulation method and the error correction encoding method is inserted in "DIUC" of DL-MAP IE, the two radio terminals MS#1 and MS#2 communicate using the common modulation method and error correction code.

The frames shown by RS#1 and RS#2 indicate an MMR link between the radio base station BS and relay station RS#1, and an MMR link between the radio base station BS and relay station RS#2 respectively. It is preferable that the radio base station sends data addressed to the radio station MS to each relay station RS using MMR of the sub-frame in a same transmission band of the burst shown in MS#1 and MS#2. In other words, data for MS#1 is stored in RS#1 and data for MS#2 is stored in RS#2, and are sent.

Therefore the two radio terminals MS#1 and MS#2 receive the DL-MAP from the radio base station BS respectively, receive the burst defined by DL-MAP IE from the relay stations RS#1 and RS#2 respectively, demodulate and decode, and receive a respective data packet to which the CID addressed to itself is attached. In this burst, data packets are simultaneously sent from different relay stations, but these relay stations do not interfere with each other, so each radio terminal MS#1 and MS#2 can perform receive processing normally. Each relay station RS must relay only the data addressed to its subordinate radio terminals MS. Therefore even if the DL-MAP message shows that data addressed to a plurality of radio terminals MS exists, each relay station RS actually sends only the data addressed to its subordinate radio terminal MS.

Figure 6A:
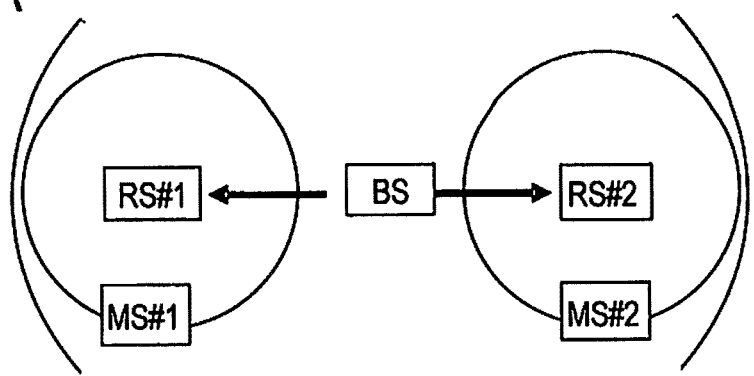
FIG. 6A and FIG. 6B are data transmission examples.
Figure 6B:
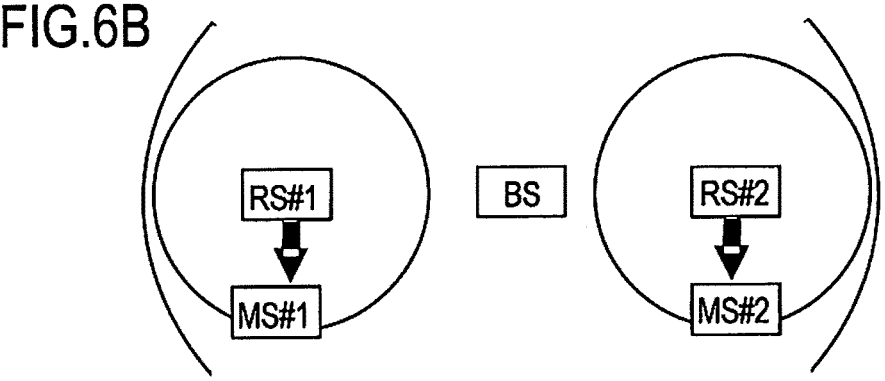

FIG. 6A and FIG. 6B depicts an example when communication is performed using DL-MAP IE depicted in FIG. 5A and FIG. 5B.

First the radio base station BS sends data to two relay stations, RS#1 and RS#2, simultaneously (same symbols), using different frequency channels (see FIG. 6A).

Then each relay station RS#1 and RS#2 sends the data to the respective subordinate radio terminals MS#1 and MS#2 simultaneously using a common frequency channel (sub-channel) (see FIG. 6B).

Since the relay stations RS#1 and RS#2, which do not interfere with each other, use the same radio resource to send data to the respective subordinate radio terminal MS#1 and MS#2, the band utilization efficiency can be improved.

It is unnecessary to send the data, which the radio base station BS sent to the relay station RS#1 in the "RS#1" burst in the sub-frame depicted in FIG. 5B, from the relay base station RS#1 to the radio terminal MS#1 in the "MS#1 and MS#2" shared burst which occurs immediately after. The data addressed to the radio terminals MS#1 and MS#2 may be sent by the relay stations RS#1 and RS#2 in advance in a radio frame immediately before this radio frame. This is because the processing delays of the relay stations RS#1 and RS#2 (e.g. processing delay to analyze such a control message as DL-MAP) are considered.

The bursts addressed to the relay stations RS#1 and RS#2 are depicted in FIG. 5B as if they were defined independently from each other, but both may be defined as one burst if the two relay stations RS#1 and RS#2 communicate using a same modulation method and error correction encoding method.

Now a block configuration example of the relay station RS will be described with reference to FIG. 7.

The relay station RS has a reception unit 31, control message extraction unit 32, PDU buffer unit 33, transmission unit 34, MAP information analysis unit 35 and control message generation unit 36.

The reception unit 31 outputs uplink radio channel performance information measured by a signal from the radio terminal MS, and downlink radio channel performance information fed back from the radio terminal MS to the control message generation unit 36, and outputs other user data and control messages (e.g. DL-MAP message) to the control message extraction unit 32.

The control message generation unit 36 generates a control message to send the radio channel performance information from the reception unit 31 to the radio base station BS, and stores them in the PDU buffer unit 33. The stored control message is sent to the transmission unit 34 frame by frame, and is sent to the radio terminal MS.

The control message extraction unit 32 outputs the control message to the MAP information analysis unit 35, and outputs the user data to the PDU buffer unit 33.

The MAP information analysis unit 35 analyzes such a control message as the DL-MAP, so that the transmission data from the radio base station BS (data transmitted via an MMR link) based on this analysis result, and sends the relay data (user data), stored in the PDU buffer unit 33, to the subordinate radio terminal MS.

As mentioned above, in some cases, the relay data to the radio terminal MS may be received by another control message immediately before receiving DL-MAP, considering the processing delay to analyze DL-MAP.

The reception unit 31 receives only data to the subordinate radio terminal MS of this relay station RS, out of the data sent from the radio station BS, and discards other data received. As mentioned above, radio resources for a plurality of radio terminals MS are allocated to one burst in the DL-MAP message, but this merely sends data only to the subordinate radio terminals MS from the point of view of each relay station RS.

In the second embodiment, two radio terminals MS are defined in one burst, but needless to say, three or more radio terminals MS can be defined if three or more relay stations RS which do not interfere with each other exist. In this case as well, the same radio resource is allocated to each radio terminal MS, so utilization efficiency of the radio resource can be improved.

Third Embodiment

A third embodiment will now be described.

Figure 8:
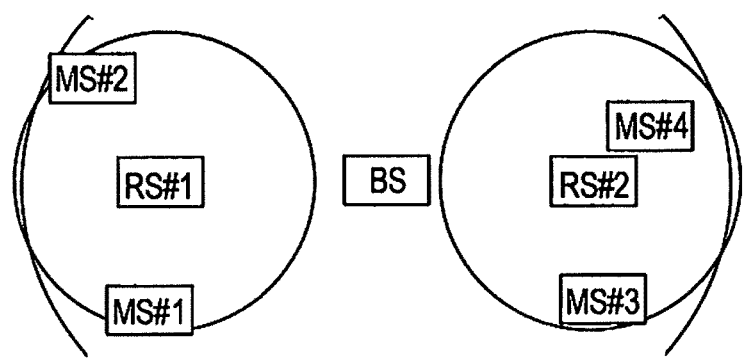
FIG. 8 is a distribution example of radio terminals.

In this embodiment, the following example is considered. FIG. 8 depicts a distribution example of radio terminals MS. As FIG. 8 depicts, the radio terminals MS#1, MS#2 and MS#3 are located at the cell edges of relay stations RS. It is assumed that the relay stations RS#1 and RS#2 and these radio terminals MS#1, MS#2 and MS#3 perform communication by QPSK. It is also assumed that the radio terminal MS#4, which is located near the relay station RS#2, performs communication by 16QAM, whereby fast communication is possible. And it is assumed that the data volume which each relay station RS sends to each radio terminal MS is the same. In this case, the data addressed to the radio terminal MS#4 can be sent using the radio resource (number of sub-channels), half that of other radio terminals MS. The relay stations RS#1 and RS#2 do not interfere with each other.

Figure 9A:
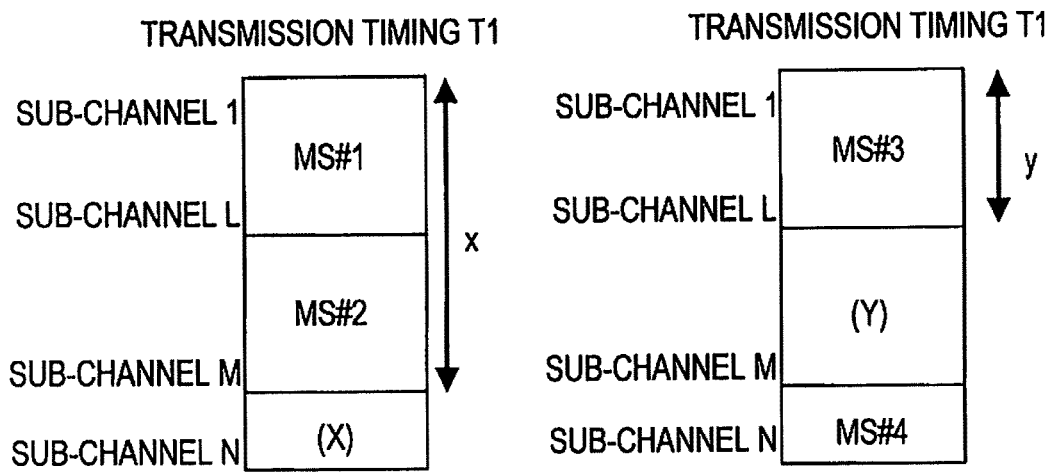
FIG. 9A and FIG. 9B are examples of DL-MAP information and data transmission.

FIG. 9A depicts an example of DL-MAP information and data transmission. Since the three radio terminals MS#1, MS#2 and MS#3 use a common QPSK communication method, MS#3 can use the same transmission area as MS#1 and (or) MS#2. In FIG. 9A, MS#1 and MS#3 use the same transmission area (same transmission timing, same transmission sub-channel).

A different resource is allocated to the radio terminal MS#4 however. In FIG. 9A, the transmission timing of MS#4 is the same as the transmission timing of MS#3. But the transmission sub-channel is different from the transmission sub-channels used by MS#1, MS#2 and MS#3.

In this case, in the relay station RS#1, for example, the radio terminal MS#4 is not the subordinate radio terminal MS, and the transmission area X allocated to the radio terminal MS#4 is not used. On the other hand, in the relay station RS#2, a band Y which is a band other than the band allocated to the radio terminal MS#3 among from the bands of QPSK is not used.

Figure 9B:
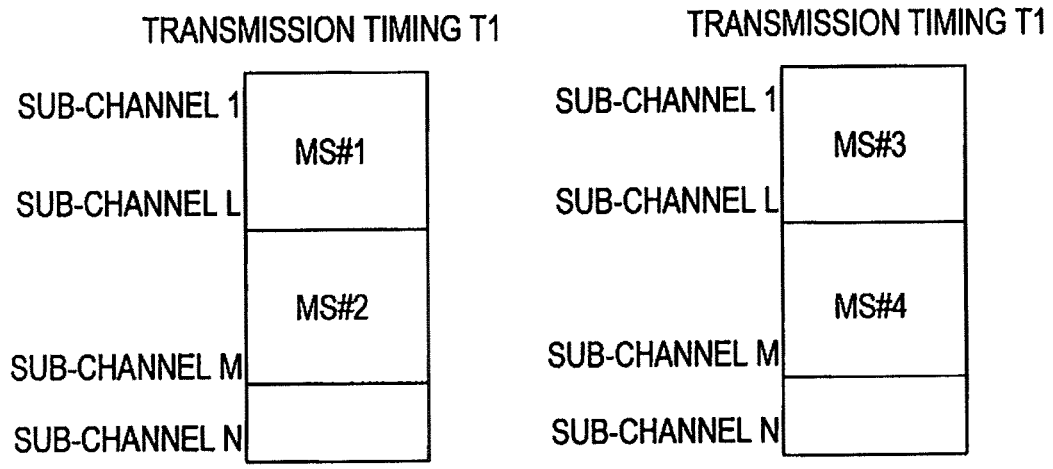

Therefore in the third embodiment, the radio terminal MS#4 is changed to communication based on QPSK, as depicted in FIG. 9B, so that the radio resource used for the radio terminal MS#4 depicted in FIG. 9A can be used for the radio base station BS (e.g. radio terminals MS under the radio base station BS) and other relay stations RS, whereby utilization efficiency of the radio resource can be improved.

Figure 10:
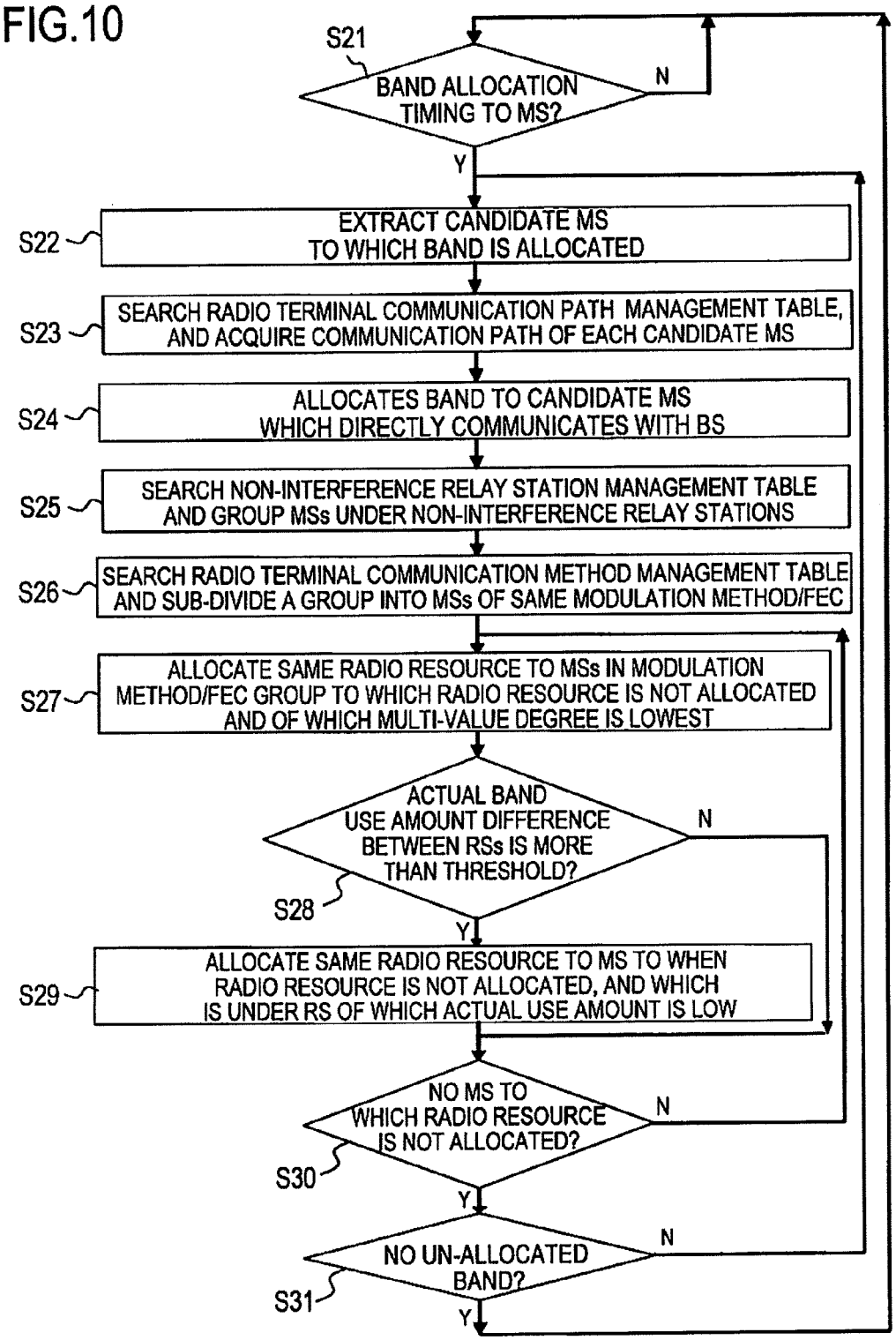
FIG. 10 is a flow chart depicting an example of band allocation processing.

FIG. 10 is a flow chart depicting the transmission area allocation processing which is executed by the radio base station BS. This processing is executed in the radio frame configuration information generation unit 19. Processing from S21 to S26 is the same as the processing from S11 to S16 of FIG. 4. In the radio terminals MS under the non-interference relay stations RS, radio terminals MS using the same modulation method and same error correction encoding method are grouped.

And the same radio resource is allocated to radio terminals MS in a group to which the radio resource is not allocated, and which uses the modulation method and error correction encoding group having a lowest multi-value degree (S27). For example, the multi-value degree is low in the case of QPSK, and the multi-value degree is high in the case of 16QAM. This can be judged by storing the multi-value degree when the modulation method and error correction encoding method are combined in the radio base station BS, and referring to it in this processing. In the case of the example in FIG. 9A, the multi-value degree of the group of QPSK is lowest, so the radio resource is allocated first to the group of QPSK.

Then it is judged whether the difference of actual band use amounts between relay stations RS is more than a threshold (S28). For example, in the case of the above mentioned example, it is judged whether the difference "x−y" between the actual band use amount "x" of the relay station RS#1 and the actual band use amount "y" of the relay station RS#2 is more than the threshold. This judges whether a sufficient amount of band to use is available.

If more than the threshold (Y in S28), the same radio resource is allocated to radio terminals MS, which are under the relay station RS of which actual use amount is low, and to which the radio resource is not allocated (S29). For example, in the case of the above mentioned example, when the difference "x−y" (area of band Y) is sufficient for use, the radio resource the same as that of the group of QPSK is allocated to the radio terminal MS#4 under the relay station RS#2 of which actual use amount is low. FIG. 9B depicts an example of the DL-MAP information when the same radio resource is allocated. The MS#4 uses QPSK as the communication method, in spite of being judged that communication using QAM can be performed by adaptive modulation control If not more than the threshold (N in S28), the sufficient band amount to use is not secured, so the processing moves to S30, without executing the processing in S29.

If there is the radio terminal MS to which the radio resource is not allocated (N in S30), the processing moves to S27, and the above mentioned processing is repeated. If there is no radio terminal MS to which the radio resource is not allocated (Y in S30), it is judged whether an un-allocated band exists (S31). If the un-allocated band exists (N), the processing moves to S22, and if the un-allocated band does not exist (Y in S31), creation of the DL-MAP is completed, and the DL-MAP is sent.

The processing then moves to S21, and the above mentioned processing is repeated.

Needless to say, data addressed to each radio terminal is sent from the radio base station BS to the corresponding relay station RS so that the data can be sent in the transmission area defined in the DL-MAP, and each relay station sends the data addressed to the radio terminal, which is received from the radio base station BS in the transmission area defined in the DL-MAP.

Fourth Embodiment

A fourth embodiment will now be described.

In the third embodiment, the radio resource of the radio terminal MS having a low multi-value degree is allocated to the radio terminal MS having a high multi-value degree. On the other hand, the fourth embodiment is an example when the radio resource of the radio terminal MS having the high multi-value degree is allocated to the radio terminal MS having the low multi-value degree.

Figure 11:
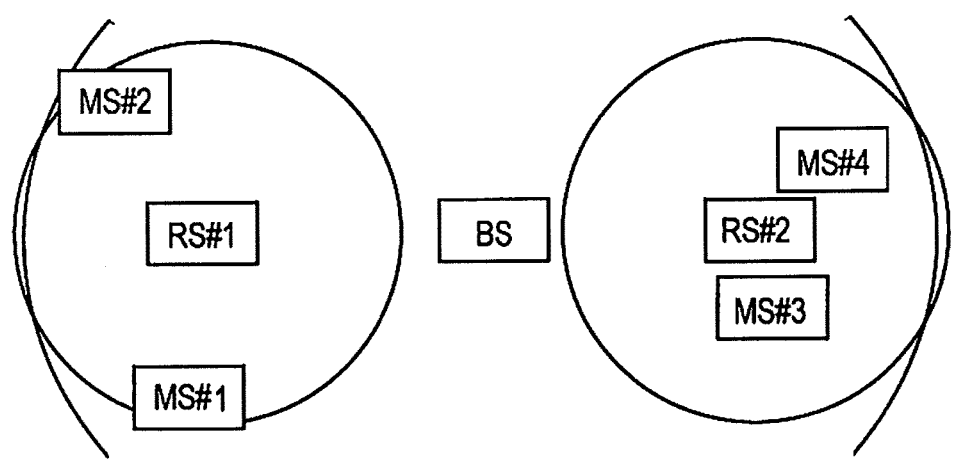
FIG. 11 is a distribution example of radio terminals.

The following example is considered. FIG. 11 depicts a distribution example of the radio terminals MS. As FIG. 11 depicts, radio terminals MS#1 and MS#2 are located at the cell edges of the relay station RS#1. For these radio terminals MS#1 and MS#2, QPSK communication is performed.

On the other hand, Radio terminals MS#3 and MS#4 are located near the relay station RS#2. For these radio terminals MS#3 and MS#4, 16QAM communication is performed.

The data amount to be sent to each radio terminal MS is the same. Data addressed to the radio terminals MS#3 and MS#4 can be sent using the radio resource half that for the data addressed to radio terminals MS#1 and MS#2.

Figure 12A:
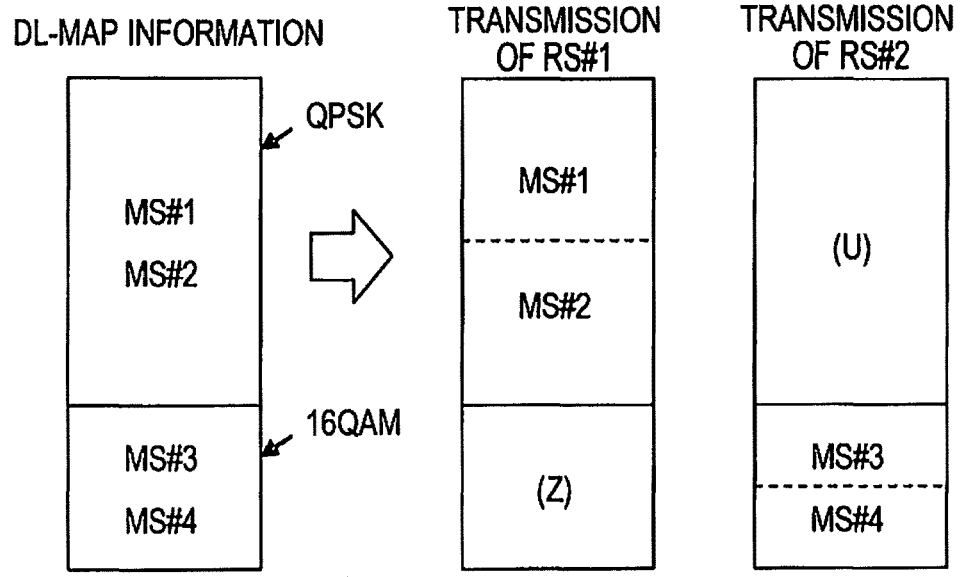
FIG. 12A and FIG. 12B are examples of DL-MAP information and data transmission.

If the processing according to the second embodiment is performed here, the different radio resource is allocated in the DL-MAP information, for the group of the radio terminals MS#1 and MS#2 which perform QPSK communication, and for the group of the radio terminals MS#3 and MS#4 which perform 16QAM communication as depicted in FIG. 12A.

For the transmission of the relay station RS#1, the band Z allocated to the radio terminals MS#3 and MS#4 is not used, and for the transmission of the relay station RS#2, the band U allocated to the radio terminals MS#1 and MS#2 is not used.

Figure 12B:
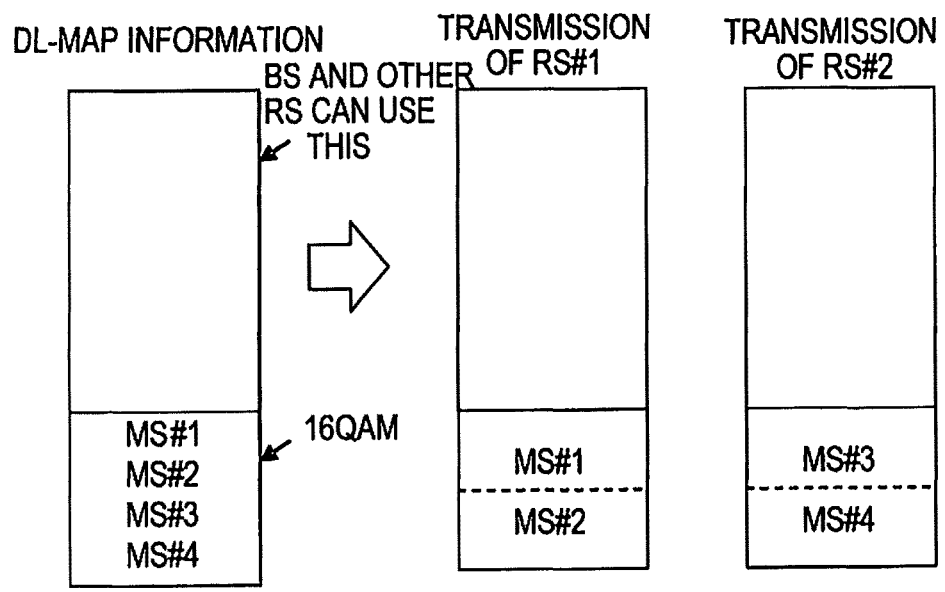

In the fourth embodiment, the radio resource the same as that of the radio terminals MS#3 and MS#4 which perform 16QAM communication having a high multi-value degree is allocated to the radio terminals MS#1 and MS#2 which perform QPSK communication having a low multi-value degree, as depicted in FIG. 12B. Therefore just like the case of the third embodiment, utilization efficiency of the radio resource can be improved. The radio band used for the QPSK communication in FIG. 12A can be allocated to other relay stations RS and radio base stations BS, and the utilization efficiency of the radio resource can be improved in this aspect as well.

However, in the fourth embodiment, the transmission power is increased for the radio terminals MS#1 and MS#2 which perform 16QAM communication. This is for communicating with the radio terminals MS#1 and MS#2 located at the cell edge with certainty.

FIG. 13 is a flow chart depicting a band allocation processing for radio terminals MS. This processing is executed in the radio frame configuration information generation unit 19. The processing from S41 to S46 is the same as the processing from S21 to S26 of FIG. 10. In the radio terminals MS under the non-interference relay stations RS, radio terminals MS using the same modulation method and same FEC are grouped.

And the same radio resource is allocated to radio terminals MS in a group to which the radio resource is not allocated, and which uses the modulation method and FEC having a highest multi-value degree (S47). In the case of the example in FIG. 12B, the same radio resource is allocated to the radio terminals MS#3 and MS#4.

Then it is judged whether the difference of actual band use amounts between relay stations RS is more than a threshold (S48). Just like the third embodiment, it is judged whether the sufficient amount of band to use is available.

If more than the threshold (Y in S48), a transmission power to radio terminals MS, which are under the relay station RS of which actual use amount is low and to which the radio resource is not allocated, is increased, and the same radio resource is allocated (S49). In the case of the above mentioned example, the radio resource the same as that of the radio terminals MS#3 and MS#4 is allocated to the radio terminals MS#1 and MS#2. And the relay station RS#1 is instructed to increase the transmission power when communication is performed with the radio terminals MS#1 and MS#2.

If the difference of actual band use amounts is not more than the threshold (N in S48), sufficient band amount to use is not secured, so the processing moves to S50, without executing the processing in S49.

In S50, it is judged whether there is the radio terminal MS to which the radio resource is not allocated, and if there is no un-allocated radio terminal MS (Y in S50), it is judged whether an un-allocated band exists (S51). If there is the un-allocated radio terminal MS (N in S50), processing moves to S47. If there is the un-allocated band (Y in S51), the processing moves to S41, and the above mentioned processing is repeated. If there is no un-allocated band (N in S51), creation of DL-MAP is completed and the DL-MAP is sent.

Then the processing moves to S41, and the above mentioned processing is repeated.

Needless to say, data addressed to each radio terminal is sent from the radio base station BS to the corresponding relay station RS so that the data can be sent in the transmission area defined in the DL-MAP, and each relay station sends the data addressed to the radio terminal, which is received from the radio base station BS in the transmission area defined in the DL-MAP.

Figure 14:
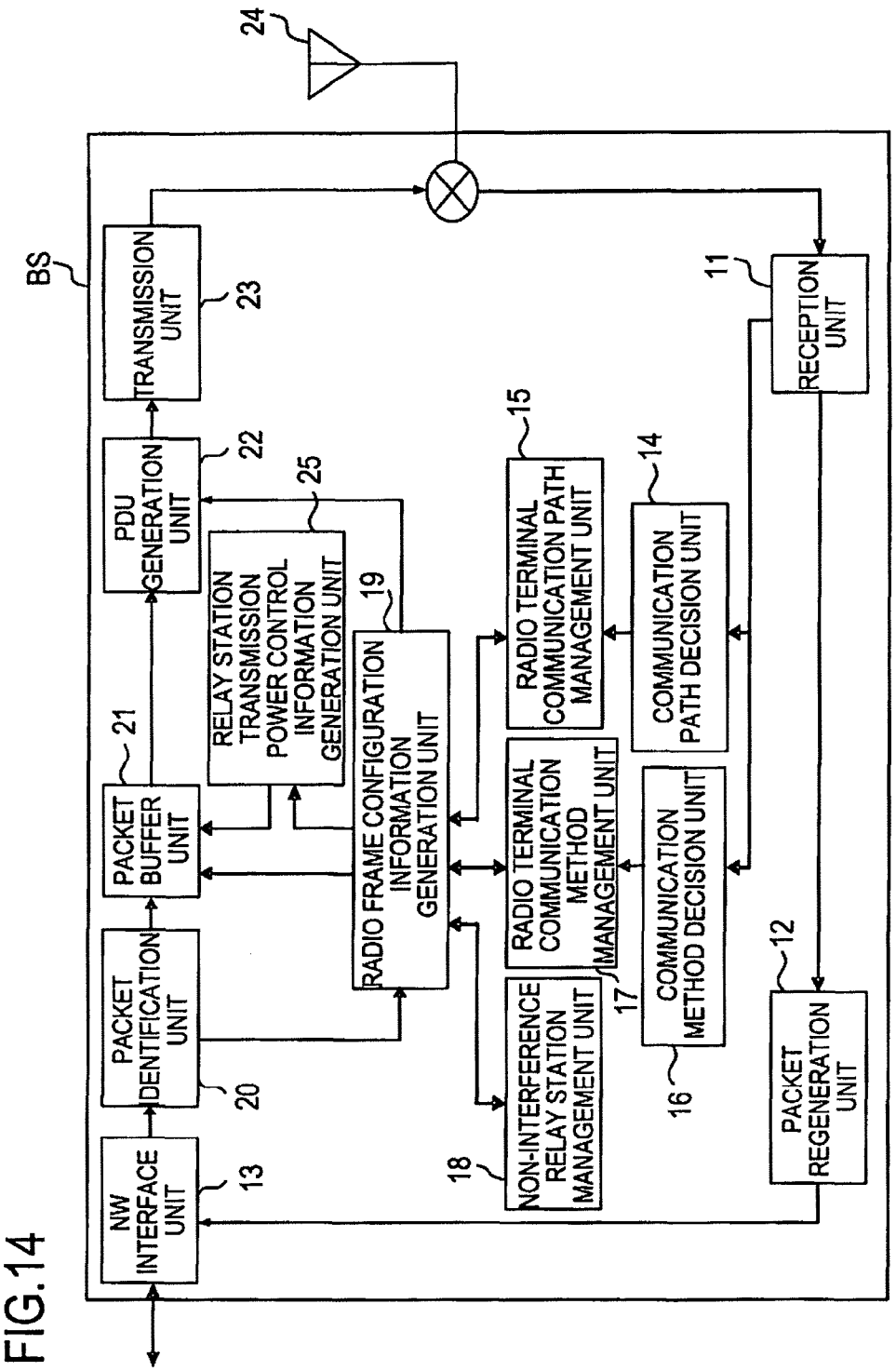
FIG. 14 is a block diagram depicting a configuration example of a radio base station.

FIG. 14 depicts a block diagram depicting a configuration example of the radio base station BS according to the fourth embodiment. The difference from the configuration of the radio base station BS depicted in FIG. 2 is that a relay station transmission power control information generation unit 25 is added.

When an instruction to increase the transmission power of the relay station RS is received from the radio frame configuration information generation unit 19, the relay station transmission power control information generation unit 25 generates a control information message, to instruct control information to increase the transmission power to this relay station RS. The generated control information message is stored in the packet buffer unit 21, and is sent according to the instruction of the radio frame configuration information generation unit 19.

The power control of the relay station RS can also be performed using Boosting information included in the DL-MAP IE (See FIG. 25).

In the fourth embodiment, an example of increasing the transmission power of the relay station RS is described, but the transmission power may be decreased so that the radio terminal MS having the high multi-value degree is matched with the lower modulation method and error correction encoding method. In this case, the relay station transmission power control information generation unit 25 receives an instruction to decrease the transmission power from the radio frame configuration information generation unit 19, and sends the control information to decrease the transmission power to the relay station RS.

Figure 7:
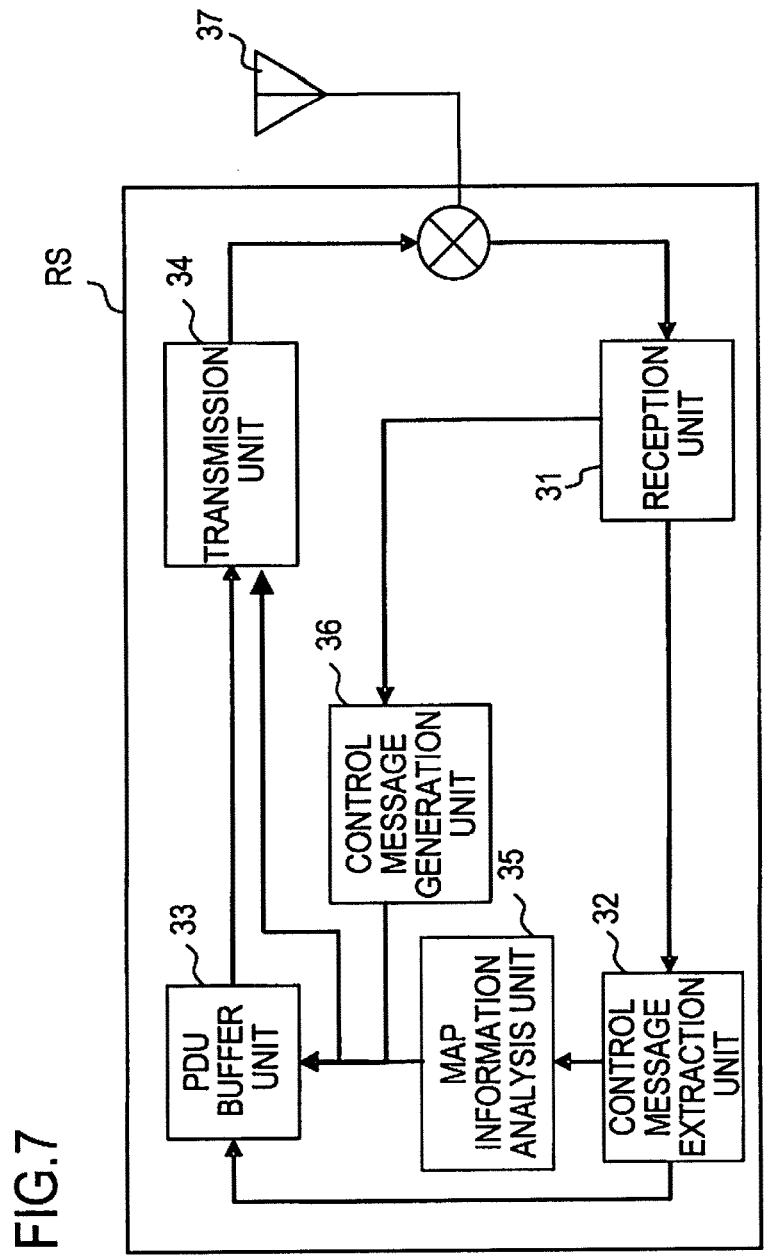
FIG. 7 is a block diagram depicting a configuration example of a relay station.

As depicted in FIG. 7, at the relay station RS side, the control information to control the transmission power is analyzed by the MAP information analysis unit 35, and the transmission unit 34 is instructed to increase or to decrease the transmission power, and based on this instruction, the transmission unit 34 adjusts the transmission power and sends the data to the radio terminal MS.

Fifth Embodiment

A fifth embodiment will now be described.

The fifth embodiment is an example of an uplink. It is the same as the second to fourth embodiments to improve utilization efficiency of the radio resource and utilization efficiency of the frequency by allocating the same transmission area to the radio terminals MS under relay stations RS which do not interfere with each other.

However, as mentioned above, compared with the case of using the DL-MAP message, each burst based on the UL-MP message is defined by the number of slots, so each burst is not located at an absolute position, but at a relative position (see FIG. 28A). Also only one CID can be specified in the UL-MAP message. Therefore a plurality of radio terminals MS cannot be located in one burst, and allocating a plurality of radio terminals MS in one uplink side transmission area is difficult.

Therefore in the fifth embodiment, at least a part, but preferably all, of the transmission area from the radio terminal MS to the relay station RS direction and the transmission area from another relay station which does not interfere to the radio base station overlap.

Allocation of the transmission area from the radio terminal MS to the relay station RS is performed using a part of the UL-MAP message, and allocation of the transmission area from the relay station RS to the radio base station BS is performed using another part of the UL-MAP message (called an RS-MAP).

For example, when the transmission area is allocated from each radio terminal MS to each relay station RS, the different transmission area (e.g. transmission time zone) is allocated respectively, and when the transmission area is allocated from each relay station RS to the radio base station, the different transmission area (e.g. transmission time zone) is allocated respectively, but an overlap of the transmission area from the radio terminal MS to the relay station RS#1 and the transmission area from the relay station RS#2, which does not interfere with the relay station RS#1, to the radio base station, is allowed.

By generating and sending such the UL-MAP message, the common radio band can be allocated to different transmission devices, and utilization efficiency of the frequency can be improved, just like the second embodiment.

Figure 15:
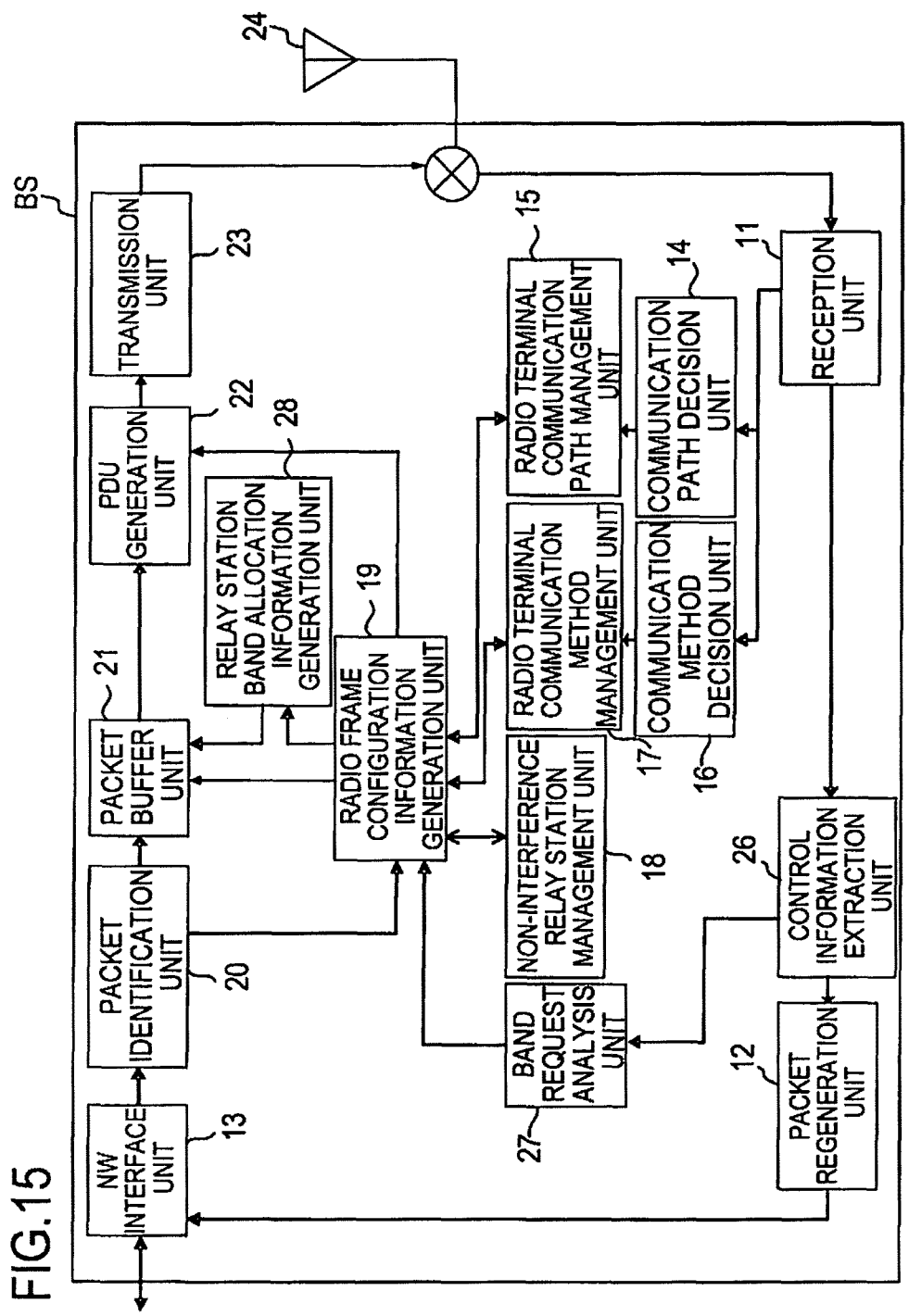
FIG. 15 is a block diagram depicting a configuration example of a radio base station.

FIG. 15 is a block diagram depicting a configuration example of the radio base station BS according to the fifth embodiment. Compared with the block configuration of the radio base station BS depicted in FIG. 2, the radio base station BS further has a control information extraction unit 26, band request analysis unit 27, and relay station band allocation information generation unit 28.

The control information extraction unit 26 extracts a band request from the reception unit 11 (a band request from the relay station RS or radio terminal MS), and outputs it to the band request analysis unit 27. The band request analysis unit 27 outputs UL-MAP message creation request information corresponding to the band request to the radio frame configuration information generation unit 19.

Based on this creation request, the radio frame configuration information generation unit 19 creates the UL-MAP message. Information for creating the UL-MAP is acquired from the radio terminal communication path management unit 15, radio terminal communication method management unit 17 and non-interference relay station management unit 18, just like the second embodiment. In this case, the radio frame configuration information generation unit 19 outputs information on the UL-MAP to the relay station band allocation information generation unit 28.

When the information on UL-MAP is received, the relay station band allocation information generation unit 28 generates an RS-MAP message (relay station band allocation information), and sends it to the relay station RS via the packet buffer unit 21.

FIG. 16A depicts an example of the RS-MAP message, and FIG. 16B depicts an example of Burst Profile RS-MAP IE (hereafter "RS-MAP IE") included in the RS-MAP message. For the RS-MAP IE, just like the DL-MAP IE (see FIG. 5A), the relay station RS to be a target is specified by "CID", and the burst is specified by "Symbol Offset" or the like, and the radio resource is allocated. Needless to say, a plurality of "CIDs" may be specified, just like the case of DL-MAP IE.

Figure 17A:
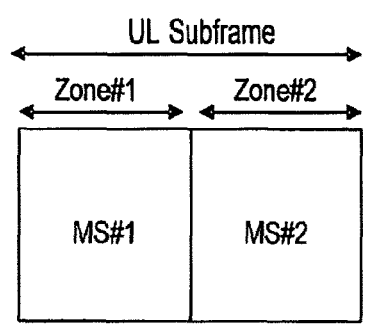
FIG. 17A and FIG. 17B are examples of sub-frames.
Figure 17B:
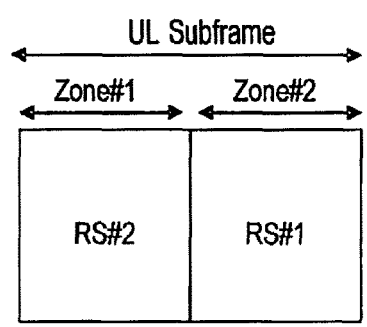

FIG. 17A and FIG. 17B depict a same transmission area in a same transmission sub-frame respectively (MAP data is omitted).

As FIG. 17A and FIG. 17B depict, band allocation for uplink (for relay station RS#1) to the radio terminal MS#1 under the relay station RS#1 is performed in time zone Zone#1, and at the same time, band allocation for uplink (for radio base station BS) to the relay station RS#2, which does not interfere with the relay station RS#1, is performed. In the next Zone#2, band allocation for transmission to the relay station RS#2, to the radio terminal MS#2 under the relay station RS#2 is performed, and band allocation for transmission to the radio base station BS, to the relay station RS#1, which does not interfere with the relay station RS#2, is performed. The UL-MAP message is created and sent so that the radio resource is allocated in this way.

For the burst depicted in FIG. 17A, a number of slots is defined in the UL-MAP message (see FIG. 27B), so the band for each radio terminal MS is allocated to the burst at a predetermined position based on this number of slots.

Figures 17C, 17D:
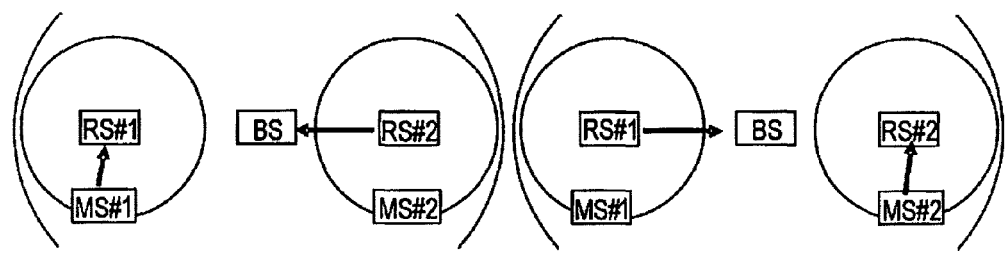
FIG. 17C and FIG. 17D are data transmission examples.
Figure 18:
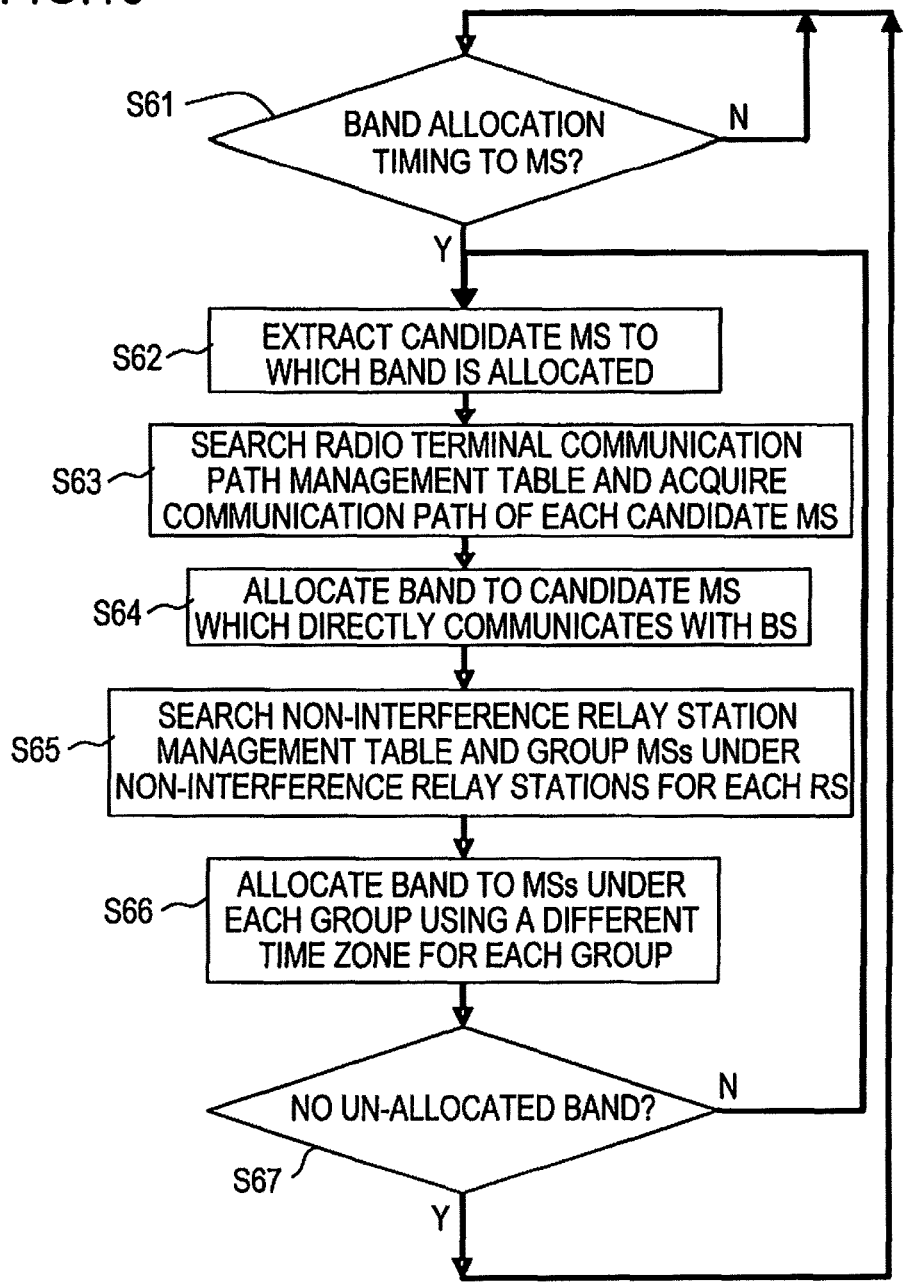
FIG. 18 is a flow chart depicting an example of band allocation processing.

FIG. 17C and FIG. 17D depict a communication status in each time zone. In Zone#1, the radio terminal MS#1 sends data to the relay station RS#1, and the relay station RS#2 also sends to the radio base station BS at the same time using the same radio resource. In Zone#2, the relay station RS#1 sends data to the radio base station BS, and the radio terminal MS#2 sends data to the relay station RS#2 at the same time using the same radio resource. FIG. 18 is a flow chart depicting the band allocation processing in the radio frame configuration information generation unit 19. The processing from S61 to S65 is the same as the processing from S11 to S15 of the second embodiment in FIG. 4.

The radio frame configuration information generation unit 19 allocates bands to radio terminals MS under each group using a different time zone depending on the respective group (S66). In the case of the above mentioned example, the same radio resource is allocated to the radio terminal MS#1 and relay station RS#2, and the same resource is allocated to the radio terminal MS#2 and relay station RS#1.

If the un-allocated band is not available (Y in S67), MAP data to indicate an allocated result is created and sent. Then, the processing moves to S61, and the above mentioned processing is repeated.

If the un-allocated band is available (N in S67), the processing moves to S62, and the above mentioned processing is repeated.

Figure 19:
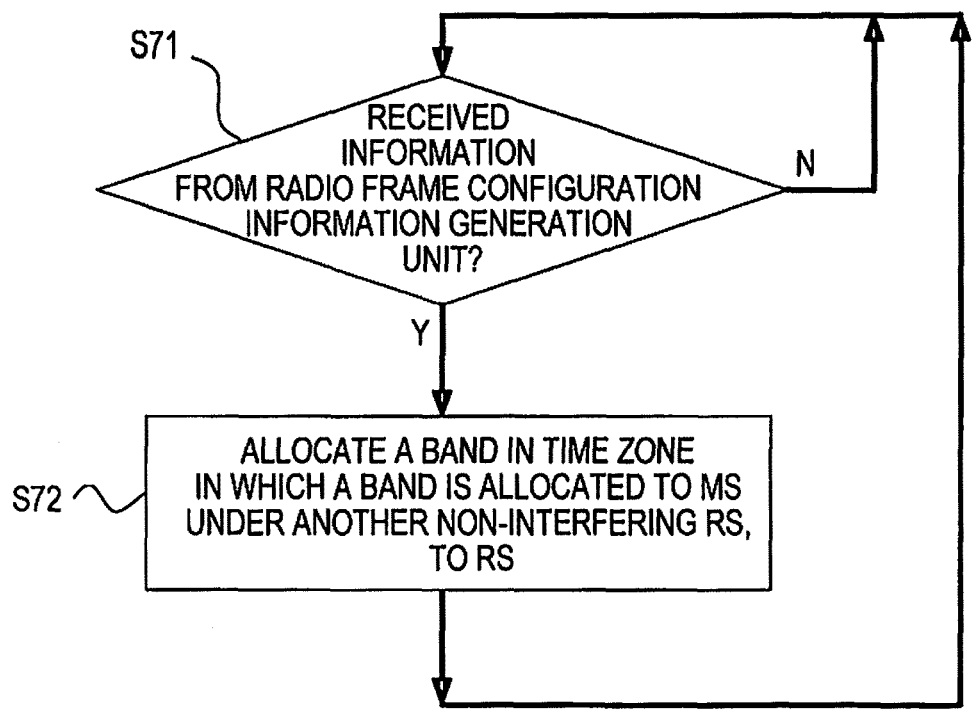
FIG. 19 is a flow chart depicting an example of band allocation processing.

FIG. 19 is a flow chart depicting processing in the relay station band allocation information generation unit 28 of the radio base station BS.

First it is judged whether information used for generating the UL-MAP information is received from the radio frame configuration information generation unit 19 (S71), and if received (Y), the band in the time zone, where the band is allocated to the radio terminal MS under another non-interfering relay station RS, is allocated to the relay station RS (S72). In the above example, the band in the time zone Zone#1, where the band is allocated to the radio terminal MS#1 under another non-interfering relay station RS#1, is allocated to the relay station RS#2. This corresponds to the RS-MAP message generation processing.

If the information is not received from the radio frame configuration information generation unit 19 (N in S71), the processing stands by until the information is received.

The fifth embodiment can be applied to the third and fourth embodiments.

Sixth Embodiment

A sixth embodiment will now be described.

In the second embodiment, a plurality of CIDs are specified in DL-MAP IE (FIG. 5A), and a same transmission area is allocated to a plurality of radio terminals MS. In the sixth embodiment, one CID is specified for one DL-MAP IE, and a same value is set for "Symbol Offset" of each DL-MAP IE, and a different value is specified for "DIUC". Thereby the same transmission area is allocated to each radio terminal MS, and the modulation method, encoding method, and encoding rate thereof can be specified to be different from each other.

By using different modulation methods, encoding methods and encoding rates from relay stations RS, which do not interfere with each other, to subordinate radio terminals, the data transmission matching the position of a radio terminal MS in the cell can be performed. For certain the same transmission area is allocated to each radio terminal MS, so utilization efficiency of the frequency can be improved.

Figure 20:
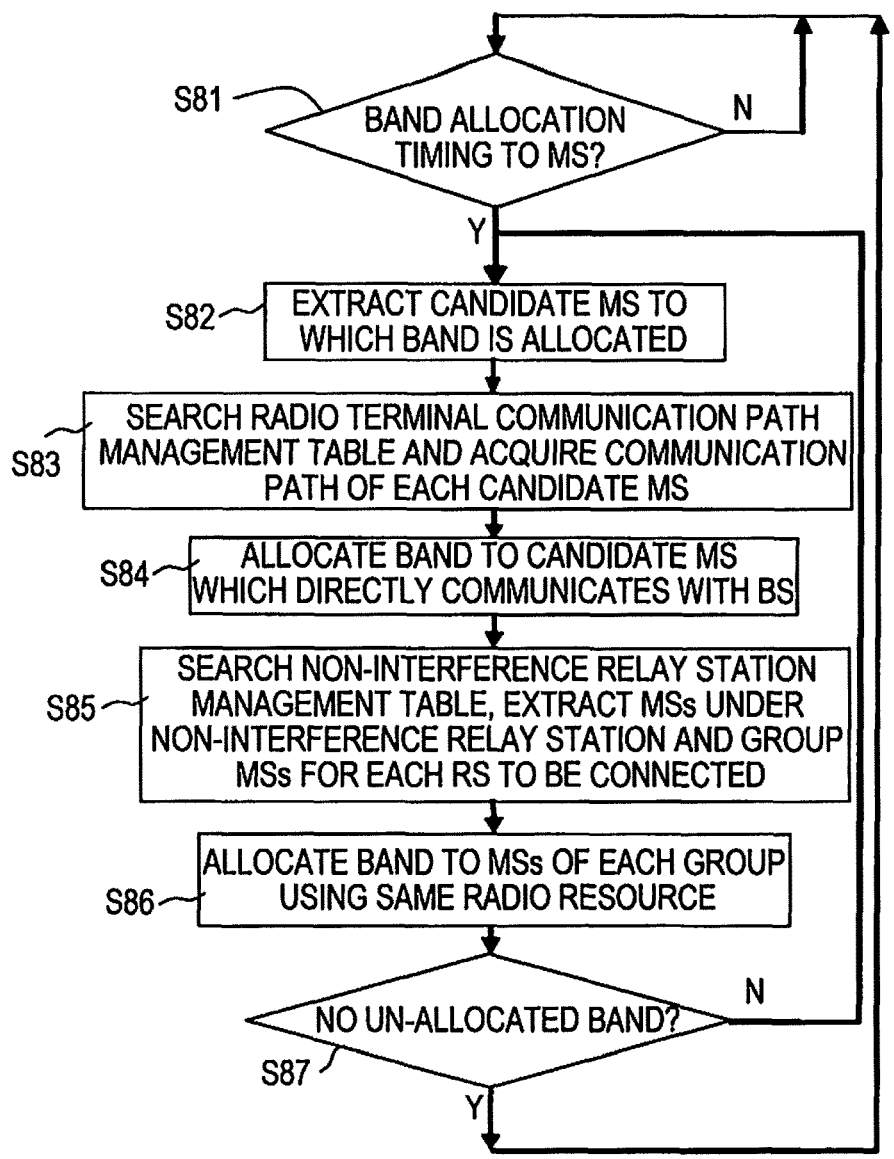
FIG. 20 is a flow chart depicting an example of band allocation processing.

FIG. 20 is a flow chart depicting the processing in the radio frame configuration information generation unit 19 according to the sixth embodiment. Processing from S81 to S84 is the same as the processing from S11 to S14 of the second embodiment (FIG. 4).

In the processing in S85, radio terminals MS under a non-interfering relay station RS are extracted by searching the non-interference relay station management table T3, and are grouped for each relay station RS to be connected. Just like the second embodiment, if radio terminals MS are distributed as depicted in FIG. 6A, the radio terminal MS#1 and radio terminal MS#2 are grouped separately.

Then using the same transmission area, the band is allocated to the radio terminals MS in each group (S86). In the above mentioned example, the band is allocated to the radio terminal MS#1 and radio terminal MS#2 using the same transmission area.

Then the same processing as S18 of the second embodiment is performed (S87).

Figure 21A:
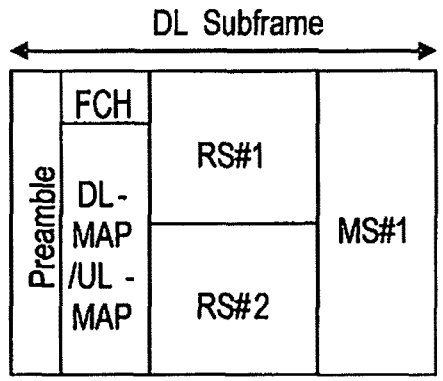
FIG. 21A and FIG. 21B are examples of sub-frames.
Figure 21B:
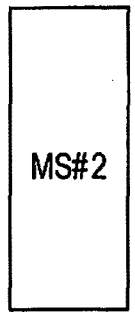

FIG. 21A and FIG. 21B depict an example of DL-MAP allocation. The two radio terminals MS#1 and MS#2 are allocated to a same burst.

Figure 21C:
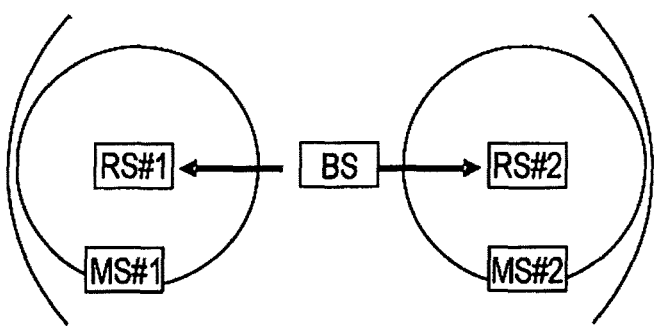
FIG. 21C and FIG. 21D are data transmission examples.
Figure 21D:
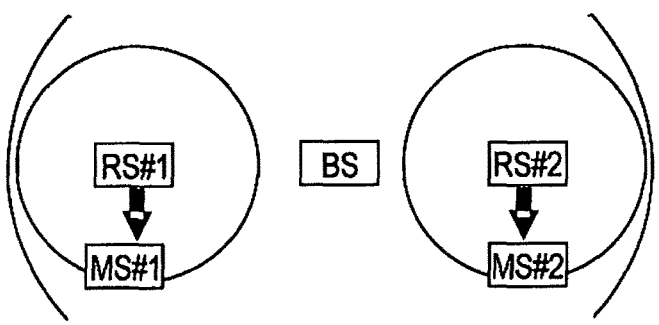
Figure 22:
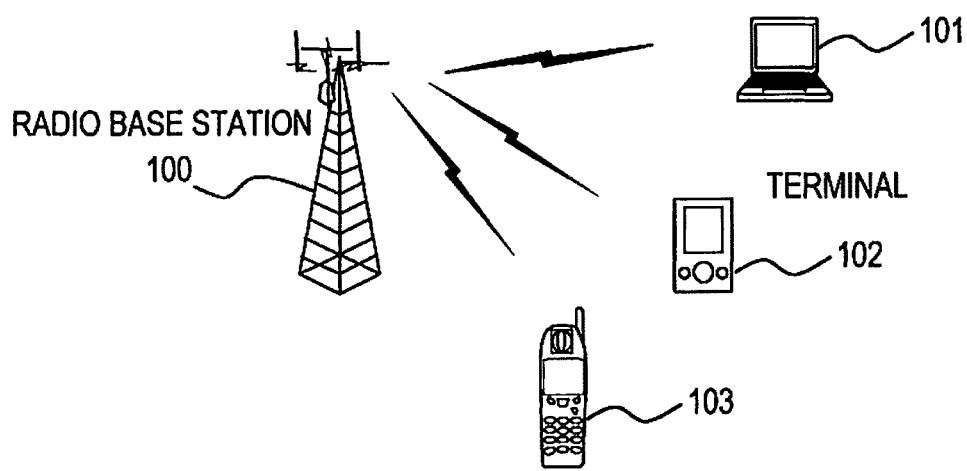
FIG. 22 depicts an example of a service image.
Figure 23:
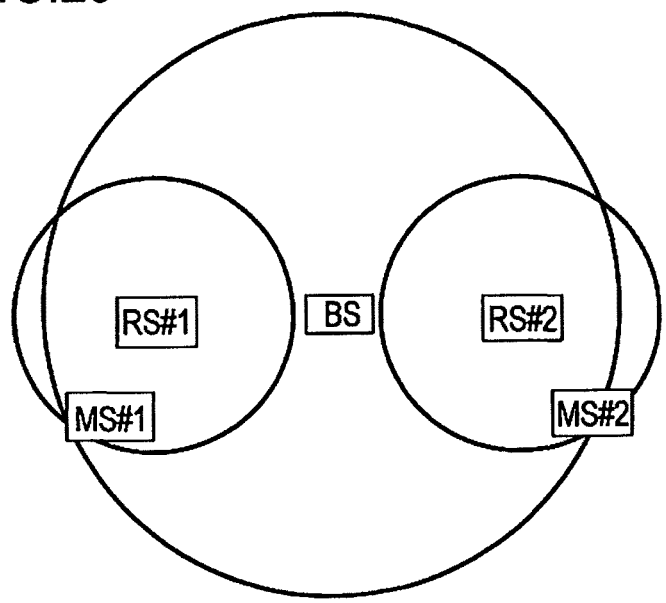
FIG. 23 depicts an example of a network configuration using relay stations.
Figure 26:
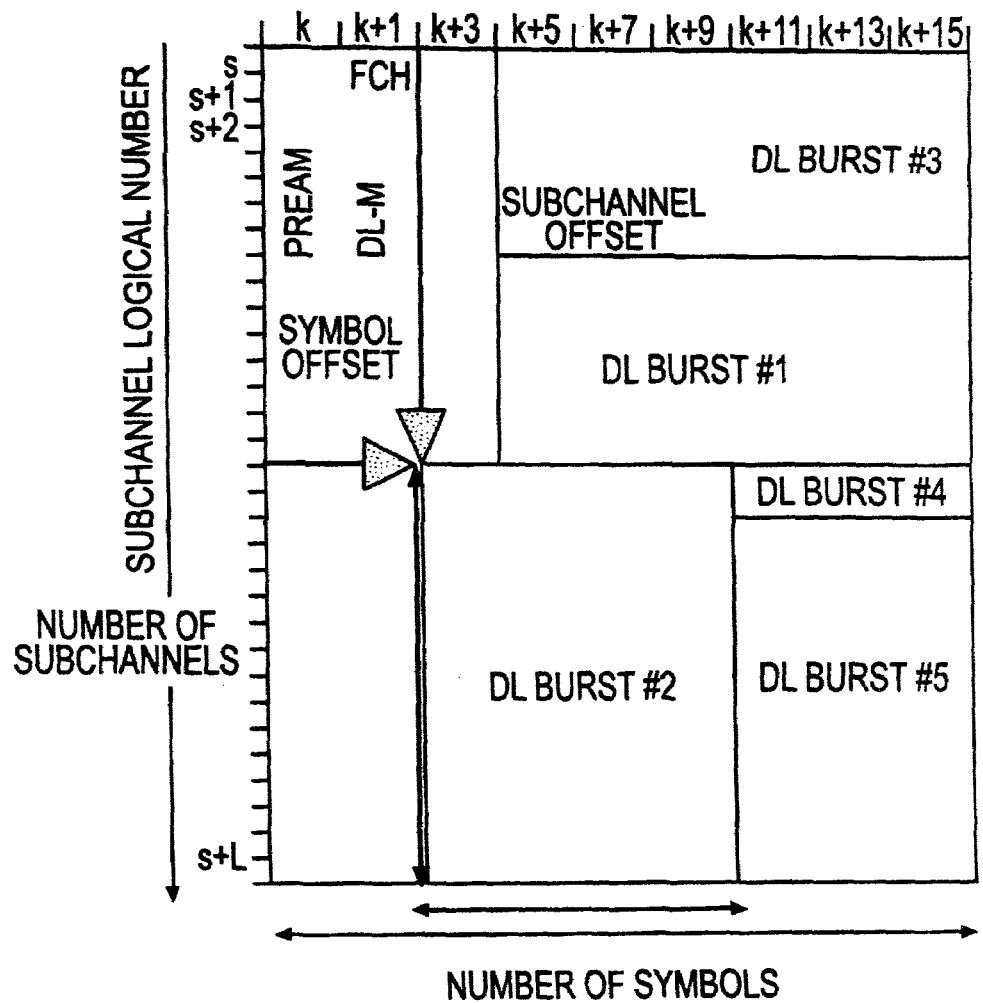
FIG. 26 is an example of a sub-frame.

FIG. 21C and FIG. 21D depicts a downlink transmission example when this allocation is performed. Data is sent from the radio base station BS to the relay stations RS#1 and RS#2 which do not interfere with each other, at a same time, and data is transmitted to the radio terminals MS#1 and MS#2 under each relay station RS#1 and RS#2 at a same time using the different modulation method.

In the sixth embodiment, downlink is described, but this embodiment can also be applied to uplink. The sixth embodiment can also be applied to the third and fourth embodiments. In either case, a same transmission area can be allocated to the radio terminals MS under non-interfering relay stations RS, and data can be sent to the radio terminals MS using the different modulation method.

In all of the above embodiments, the transmission area is shared by different transmission devices, but the transmission area to be shared need not be exactly the same. For example, the transmission areas may partially overlap in time, or the transmission sub-channels to be used may partially overlap.

It is preferable that the transmission start timing of the transmission area matches, and transmission end timing is allowed to be different in each transmission device.

The invention claimed is:

1. A radio base station which performs data transmission with radio terminals under a plurality of relay stations via the plurality of relay stations respectively, comprising:
   a map information generation unit which allocates a radio resource including a first transmission area from a first relay station to a first radio terminal under the first relay station and a second transmission area from a second relay station to a second radio terminal under the second relay station, and generates map information indicating the allocation; and
   a transmission unit which transmits the map information, wherein
   the map information generation unit specifies a modulation and encoding method in the map information to match a modulation and encoding method of the first radio terminal to a modulation and encoding method of the second radio terminal, when the modulation and encoding method of the first radio terminal is different from the modulation and encoding method of the second radio terminal, and
   the first and second transmission areas are partially or completely overlapped.

2. The radio base station according to claim 1, wherein the overlapped transmission area is a frequency channel.

3. The radio base station according to claim 1, wherein the first relay station and second relay station are located at positions in which the first relay station and second relay station do not interfere with each other.

4. The radio base station according to claim 1, wherein a same modulation method and encoding method are used in the overlapped portion.

5. The radio base station according to claim 1, wherein the map information generation unit generates control information to change transmission power to send the data from the first relay station to the first radio terminal, and sends the control information to the first relay station.

6. The radio base station according to claim 1, wherein the map information generation unit independently specifies a modulation method and encoding method of the first radio terminal, and a modulation method and encoding method of the second radio terminal in the map information.

7. A radio base station which performs data transmission with radio terminals under a first and second relay station via the first and second relay station, comprising:
   a map information generation unit which defines transmission from the first relay station to a first radio terminal under the first relay station, and transmission from the second relay station to a second radio terminal under the second relay station, in map information for defining one transmission area; and
   a transmission unit which transmits the map information, wherein
   the map information generation unit specifies a modulation and encoding method in the map information to match a modulation and encoding method of the first radio terminal to a modulation and encoding method of the second radio terminal, when the modulation and encoding method of the first radio terminal is different from the modulation and encoding method of the second radio terminal.

8. A radio base station which receives data from each radio terminal under each of a plurality of subordinate relay stations via the relay stations, comprising:
   a map information generation unit which generates map information for defining that a first transmission area to be allocated to a first radio terminal under a first relay station partially or completely overlaps a second transmission area to be allocated to a second relay station, or defining that a third transmission area to be allocated to the first relay station partially or completely overlaps a fourth transmission area to be allocated to the second radio terminal under the second relay station; and
   a transmission unit which transmits the first map information and the second map information, wherein
   the map information generation unit specifies a modulation and encoding method in the first map information to match a modulation and encoding method of the first radio terminal to a modulation and encoding method of the second relay station, when the modulation and encoding method of the first radio terminal is different from the modulation and encoding method of the second relay station, and in the second map information to match a modulation and encoding method of the first relay station to a modulation and encoding method of the second radio terminal, when the modulation and encoding method of the first relay station is different from the modulation and encoding method of the second radio terminal.

9. A communication control method in a radio communication system which performs data transmission between each radio terminal under each of a plurality of subordinate relay stations and a radio base station via the relay stations, the method comprising:
   transmitting a first data addressed to a first radio terminal under a first relay station, and a second data addressed to a second radio terminal under a second relay station, to the first and second relay station, respectively; and
   transmitting the first and second data from the first and second relay station respectively, wherein
   the radio base station specifies a modulation and encoding method to match a modulation and encoding method of the first radio terminal to a modulation and encoding method of the second radio terminal, when the modulation and encoding method of the first radio terminal is different from the modulation and encoding method of the second radio terminal, and
   a first transmission area transmitting the first date and second transmission area transmitting the second data are partially or completely overlapped.

10. A communication control method in a radio communication system which performs data transmission between each radio terminal under each of a plurality of subordinate relay stations and a radio base station via the relay stations, the method comprising:
   being transmitted a first data from a first radio terminal under a first relay station and a second data from a second relay station in transmission areas which partially or completely overlap, wherein
   the radio base station specifies a modulation and encoding method to match a modulation and encoding method of the first radio terminal to a modulation end encoding method of the second relay station, when the modulation and encoding method of the first radio terminal is different from the modulation and encoding method of the second radio terminal.

* * * * *